United States Patent [19]

Esser

[11] Patent Number: 5,605,953
[45] Date of Patent: Feb. 25, 1997

[54] CROSSLINKABLE SURFACE COATINGS

[75] Inventor: Richard J. Esser, Aarlanderveen, Netherlands

[73] Assignee: S. C. Johnson & Son, Inc., Racine, Wis.

[21] Appl. No.: 485,912

[22] Filed: Jun. 6, 1995

Related U.S. Application Data

[62] Division of Ser. No. 320,795, Oct. 7, 1994, Pat. No. 5,498,659, which is a continuation of Ser. No. 833,250, Feb. 10, 1992, abandoned.

[51] Int. Cl.$^6$ .................................................. C08J 3/00
[52] U.S. Cl. ..................... 524/522; 524/517; 524/519; 524/521; 524/523; 524/539; 524/549; 524/551; 524/556; 524/555; 524/558; 524/559
[58] Field of Search .................... 524/522, 523, 524/539, 517, 558, 559, 579, 521, 549, 551, 556, 555

[56] References Cited

U.S. PATENT DOCUMENTS

| | | | |
|---|---|---|---|
| 3,554,987 | 1/1971 | Smith | 260/79.3 |
| 3,668,183 | 6/1972 | Hoy | 528/228 |
| 3,673,168 | 6/1972 | Burke, Jr. | 526/212 |
| 3,753,958 | 8/1973 | Wingler | 526/73 |
| 3,879,357 | 4/1975 | Wingler | 526/64 |
| 3,915,921 | 10/1975 | Schlatzer, Jr. | 526/238.23 |
| 3,968,059 | 7/1976 | Shimada | 526/68 |
| 4,190,562 | 2/1980 | Westeman | 526/303 |
| 4,275,229 | 6/1981 | Mylonakis | 526/459 |
| 4,296,226 | 10/1981 | Braun et al. | 526/316 |
| 4,325,856 | 4/1982 | Ishikawa | 523/201 |
| 4,408,018 | 10/1983 | Bartman | 525/300 |
| 4,414,370 | 11/1983 | Hamielec | 526/88 |
| 4,529,787 | 7/1985 | Schmidt | 526/317 |
| 4,546,160 | 10/1985 | Brand | 526/320 |
| 4,554,018 | 11/1985 | Allen | 706/20 |
| 4,687,809 | 8/1987 | Kamikaseda | 525/57 |
| 4,751,263 | 6/1988 | Domeier et al. | 524/558 X |
| 4,772,680 | 9/1988 | Noomen | 528/229 |
| 4,855,349 | 8/1989 | Ingle | 524/558 X |
| 4,894,397 | 1/1990 | Morgan | 523/201 |
| 4,906,684 | 3/1990 | Say | 524/548 |
| 4,929,661 | 5/1990 | Noomen | 524/259 |
| 4,975,481 | 12/1990 | Tamm et al. | 524/522 X |
| 4,987,177 | 1/1991 | Den Hartog et al. | 524/517 |
| 4,987,186 | 1/1991 | Akiyama et al. | 525/107 |
| 4,988,759 | 1/1991 | Den Hartog et al. | 524/517 |
| 4,988,762 | 1/1991 | Overbeek et al. | 524/839 |
| 5,055,510 | 10/1991 | Kissel | 524/211 |
| 5,064,719 | 11/1991 | Den Hartog et al. | 428/411.1 |
| 5,070,136 | 12/1991 | Dersch et al. | 524/555 |
| 5,157,071 | 10/1992 | Ingle | 524/558 X |
| 5,221,581 | 6/1993 | Palmer et al. | 428/425.8 |
| 5,484,849 | 1/1996 | Bors et al. | 525/167.5 |

FOREIGN PATENT DOCUMENTS

| | | |
|---|---|---|
| 0262720A1 | 4/1988 | European Pat. Off. . |
| 0264983A1 | 4/1988 | European Pat. Off. . |
| 0326723A1 | 8/1989 | European Pat. Off. . |
| 0341886A2 | 11/1989 | European Pat. Off. . |
| 0390370A1 | 10/1990 | European Pat. Off. . |
| 417824A1 | 3/1991 | European Pat. Off. . |
| 438216A2 | 7/1991 | European Pat. Off. . |
| 0492847A2 | 7/1992 | European Pat. Off. . |
| 2535372A1 | 2/1977 | Germany . |
| 1541891 | 3/1979 | Germany . |
| 3713511A1 | 12/1987 | Germany . |
| 1241226 | 8/1971 | United Kingdom ........... 525/300 |

OTHER PUBLICATIONS

Application For The Acetoacetyl Functionality In Thermoset Coatings Authors—F. Del Rector et al. dated Feb., 1988.
ASTM D 2354-86. Standard Test Method For Minimum Film Formation Temperature (MFT) of Emulsion Vehicles.
Chemical & Engineering News—May 6, 1991.
Chemical & Engineering News—Jun. 24, 1991.
Principles of Polymerization (Second Edition) published by John Wiley & Sons.
Technical Data Sheet—Pendulum Hardness Tester.
F. Del Rector, et al., "Synthesis of acetoacetylated resins and applications for acetoacetylate chemistry in thermoset coatings", Polymers, Paint and Colour Journal, vol. 180, No. 4264, Jul. 4, 1980, pp. 462–470.
F. Del Rector, et al., "Synthesis of acetoacetylated resins and applications for acetoacetate chemistry in thermoset coatings", Surface Coatings Australia, vol. 26(9), pp. 6–8, 11–15, Sep., 1989.

*Primary Examiner*—Judy M. Reddick
*Attorney, Agent, or Firm*—R. E. Rakoczy; J. W. Frank

[57] ABSTRACT

A novel aqueous polymeric formulation is disclosed. Also disclosed are methods of making the polymeric formulation, and of using the polymeric formulation to produce a crosslinked polymeric surface coating on a substrate. One embodiment of the novel polymeric formulation comprises an aqueous carrier; at least one polymeric-ingredient; a non-polymeric polyfunctional amine; and base. The one polymeric ingredient has both acid-functional and acetoacetoxy-type functional pendant moieties. The non-polymeric polyfunctional amine has at least two amine-functional moieties. The amount of base contained within the formulation is effective for inhibiting gellation, which would otherwise occur as a result of crosslinking between the acetoacetoxy-type functional and amine-functional moieties. Another embodiment of the novel polymeric formulation comprises at least two polymeric ingredients, one of which has acetoacetoxy-type functional pendant moieties and the other of which has acid-functional pendant moieties.

43 Claims, No Drawings

CROSSLINKABLE SURFACE COATINGS

This is a divisional of application Ser. No. 08/320,795, filed on Oct. 7, 1994 now U.S. Pat. No. 5,498,659 which is a continuation of Ser. No. 07/833,250 filed on Feb. 10, 1992 abandoned.

TECHNICAL FIELD

The present invention is generally directed to novel polymeric compositions-of-matter that are able to provide various substrates with crosslinked polymeric surface coatings and films at room temperature. Such compositions-of-matter, for example, may take the form of a solution, a dispersion, an emulsion, or a formulation, as dictated by a particular "end-use" requirement or other consideration.

In that regard, one particularly noteworthy aspect or feature of the present invention is directed to a formulation that is characterized as a storage-stable single-package novel polymeric composition-of-matter that contains at least one polymeric ingredient. Additional embodiments of the composition-of-matter of the present invention contain two or more polymeric ingredients. In the case where there is only one polymeric ingredient, such polymeric ingredient has both acid-functional as well as acetoacetoxy-type functional pendant moieties; and in the case where there are two or more such polymeric ingredients, one has only acid-functional pendant moieties and the other has only acetoacetoxy-type functional pendant moieties.

Yet another ingredient of the novel formulation or composition-of-matter is a "non-polymeric" polyfunctional amine having at least two amine-functional moieties.

The composition-of-matter or formulation of the present invention further includes "base", in an amount that is effective for providing storage stability.

The formulation or composition-of-matter additionally includes certain volatile, "carrier" ingredients that are able to evaporate at room temperature.

Still another aspect or feature of the present invention is directed to novel methods of producing the novel polymeric compositions-of-matter, briefly mentioned above.

Yet another aspect or feature of the present invention is directed to a method of applying the novel polymeric compositions-of-matter or formulations onto a substrate, for purposes of producing a crosslinked polymeric surface coating on the substrate at room temperature.

BACKGROUND ART

In February of 1988, F. Del Rector et al. (three authors in total) presented in New Orleans, La., United States of America, a technical paper entitled "Applications For The Acetoacetyl Functionality In Thermoset Coatings".

Briefly stated, these three authors reviewed some of the many, then-known methods and/or procedures for incorporating certain so-called "activated methylene" groups into different types or classes of resins, for purposes of preparing certain polymeric thermoset surface coatings and films, via a number of then-known crosslinking mechanisms.

More particularly, these authors discussed various well-known methods for reacting certain acetoacetyl-functional moiety-containing polymers with certain melamines, with certain isocyanates, with certain aldehydes, with certain diamines, and with certain other specified reactants via the so-called "Michael" reaction, to achieve desired crosslinking of the acetoacetyl-functional moiety.

For example, European Patent Application 0 326 723/A1 (assigned to Rohm & Haas Co.) discloses one such well-known method for producing a conventional "two-package" polymeric surface-coating composition that is said to be able to "cure" at ambient conditions. In particular, when the contents of the two packages constituting the composition are combined, the composition is said to consist of a tertiary amine ingredient, a second ingredient characterized as an epoxide ingredient, a third ingredient characterized as an acetoacetoxy ingredient, and a fourth ingredient that is said to possess Michael-reactive double bonds.

U.S. Pat. No. 4,408,018 (to Bartman et al.) notes that the reaction of acetoacetic ester with acrylic acid ester in the presence of a strong base is illustrative of the Michael reaction. Bartman et al. further note that certain "enols" as well as certain "enolates" are known to add across the double bonds of certain alpha, beta-unsaturated ketones and esters. In general, the '018 Bartman patent is directed to crosslinking acetoacetate-type moiety-containing monomer (via the noted Michael reaction) with certain alpha, beta-unsaturated esters. In particular, when tetrabutyl ammonium hydroxide is used as "base", as is disclosed in the '018 Bartman patent, a composition containing the above-discussed, known, mutually-reactive ingredients is said to gel in three (3) hours or less.

Indeed, well-known two-package polymeric surface-coating compositions (or formulations) containing the above-mentioned mutually-reactive ingredients typically gel rapidly, after the mutually-reactive ingredients are combined; and such a "rapid-gelling" characteristic oftentimes renders such known compositions either inappropriate for various applications or simply undesirable. For example, the use of two-package polymeric surface coatings of this sort may give rise to "waste"; and, because of such generation of waste, such two-package compositions may therefore be environmentally less desirable than a single-package composition.

U.S. Pat. No. 3,668,183 to Hoy et al. discloses single-package polymeric surface-coating compositions that include a "blocked" polyamine ingredient as well as a polyacetoacetate or a polyacetoacetamide ingredient that is mutually-reactive with the polyamine. (A ketone or aldehyde is utilized as the "blocking" agent, for the polyamine ingredient.) The various single-package polymeric compositions disclosed in the '183 Hoy patent are typically diluted with conventional solvents. Illustrative solvents include an assortment of commercially-available solvents, wherein such are often characterized as volatile organic compounds ("VOCs"). Typically, water is not included as such a solvent, in the formulation of single-package polymeric compositions. Indeed, as disclosed in the '183 Hoy patent, such single-package polymeric compositions are characterized as being relatively stable, only in the absence of water.

Furthermore, U.S. Pat. No. 4,772,680 (to Noomen et al.) points out that the coating compositions disclosed in U.S. Pat. No. 3,668,183 to Hoy et al. (discussed above) are known to possess certain undesirable properties. For example, Noomen et al. note that the coating compositions of the '183 Hoy patent are known to display certain "unsatisfactory" properties, both to water as well as to certain acids, and unsatisfactory "weathering" properties, when subjected to certain outdoor-exposure conditions.

To distinguish their invention from the '183 Hoy patent, Noomen et al. point out (in the '680 patent) that their invention is based upon liquid coating compositions that include a polyacetoacetate ingredient and a blocked polyamine ingredient which is said to be "different" from the blocked polyamine ingredient that is disclosed in the '183 Hoy patent. In particular, the amino groups of the polyamine ingredient disclosed in the '680 Noomen patent are said to be blocked by an aldehyde or ketone of specified structure; and water is identified as a "suitable" solvent. However, when Noomen et al., in their number of examples, prepare various coating compositions by combining the mutually-reactive polyacetoacetate-containing and "blocked" polyamine-containing ingredients, such compositions are shown to "gel" in 3 hours or less, which is impractical for a number of surface-coating applications.

Thus, a practical single-package polymer-based coating composition, containing the two above-discussed mutually-reactive ingredients—namely, an acetoacetate-type moiety-containing ingredient and an amine moiety-containing ingredient—has not heretofore been able to be made. Yet, a practical, commercially-available single-package coating composition containing these two particular mutually-reactive ingredients is presently in great demand.

For example, European Patent Application 0 341 886/A2 (assigned to ICI Resins BV) discloses an aqueous coating composition that is characterized as a polymer "system" which is said to include a vinyl polymer having chain-pendant amine-functional groups as well as chain-pendant carbonyl-functional groups. Alternatively, the polymer system may include a vinyl polymer bearing a chain-pendant amine-functional group and another polymer molecule bearing a chain-pendant carbonyl-functional group.

Such a coating composition is said to be able to undergo a so-called "self crosslinking" reaction during and/or after coating formation.

It is thought that the "self crosslinking" reaction occurs via the formation of azomethine groups. Chain-pendant amine functionality is said to be preferably introduced into the vinyl polymer via an "imination" reaction, which in turn is said to preferably involve carboxyl (or carboxylate salt) groups of a precursor polymer and an aziridine compound.

Particularly preferred vinyl polymers, which are said to include pendant polymerized units having amine-functional groups as well as pendant polymerized units derived from olefinically-unsaturated monomer, include polymerized units derived from acetoacetoxyethyl methacrylate. Examples 2 and 9 each describe the preparation of an aqueous-based coating composition that was used to produce a film on glass plates. There is, however, no disclosure or even a suggestion in European Patent Application 0 341 886/A2 that these aqueous-based coating compositions possess any storage stability over an extended period of time.

Another example of an aqueous coating composition is disclosed in European Patent Application 0 390 370/A1 (assigned to Imperial Chemical Industries PLC and ICI Resins BV). In particular, European Patent Application 0 390 370/A1 discloses a coating composition—also characterized as "self crosslinkable"—that is said to include at least one polymer having chain-pendant amine-functional groups as well as at least one so-called "non-polymeric" compound having at least two ketone groups that are reactable with the chain-pendant amine groups.

It is thought that the "self crosslinking" reaction occurs via the formation of enamine groups, via elimination of water.

While European Patent Application 0 390 370/A1 discloses that these aqueous-based coating compositions seem to possess 5 weeks storage stability, there is no disclosure or even a suggestion in European Patent Application 0 390 370/A1 that these aqueous-based coating compositions possess any storage stability for an extended period of time such as one (1) year or more.

It is, therefore, clearly presently desirable that there be commercially available a single-package polymeric surface coating composition containing the above-discussed mutually-reactive acetoacetoxy-type functional and amine-functional ingredients. It would further be desirable that such a coating composition be stable over an extended period of time such as 12 months or even longer at room temperature, prior to use.

Moreover, because of the present desire to reduce the total amount of industrial solvents known as volatile organic compounds ("VOCs"), in both consumer and various industrial compositions and formulations, it would be even more desirable that such a single-package composition be water-based as well.

SUMMARY DISCLOSURE OF INVENTION

As was briefly mentioned above, one aspect or feature of the present invention is directed to a storage-stable single-package novel polymeric composition-of-matter or formulation that contains at least one polymeric ingredient. Additional embodiments of the composition-of-matter of the present invention contain two or more polymeric ingredients. In the case where there is only one polymeric ingredient, such polymeric ingredient has both acid-functional as well as acetoacetoxy-type functional pendant moieties; and in the case where there are two or more such polymeric ingredients, one has only acid-functional pendant moieties and the other has only acetoacetoxy-type functional pendant moieties.

Still another ingredient of the composition-of-matter or formulation is a so-called "non-polymeric" polyfunctional amine-containing compound having at least two amine-functional moieties.

Optional additional ingredients include polymeric thickeners, polymeric flow-modifying ingredients, and various dispersion or emulsion polymers as well as various solution polymers.

The composition-of-matter or formulation of the present invention further includes "base", in an amount that is effective for providing storage stability.

The composition-of-matter or formulation additionally includes an evaporable carrier. The evaporable carrier may consist essentially of water only, or may comprise water and at least one additional volatile liquid that is able to evaporate at room temperature, wherein the total amount of volatile organic compounds ("VOCs") in the formulation does not exceed 200 grams per liter of the formulation.

The novel polymeric composition-of-matter of the present invention is thus a water-based, "single-package" polymeric composition. Moreover, until used, the novel single-package water-based composition of the present invention will remain stable for 12 months or more, when stored at ambient or room temperature. Still further, the single-package water-based polymeric composition of the present invention possesses "improved" storage stability, in comparison to conventional single-package compositions, when stored at elevated temperature such as 35 degrees Celsius to 55° C. over extended periods of time.

To use, the aqueous polymeric composition-of-matter of the invention is simply applied to a suitable substrate.

Suitable substrates include cardboard, paper, wood, linoleum, concrete, stone, marble and terrazzo, and a variety of metal surfaces including polished metal surfaces and metal foils.

Evaporation (from the substrate) of the volatile components or ingredients of the aqueous polymeric composition, at room temperature or at elevated temperature, in turn enables the acetoacetoxy-type functional moieties contained within the composition to desirably crosslink with the amine-functional moieties (also contained within the composition), thereby producing a crosslinked polymeric coating on the substrate.

These and other features and advantages of the present invention will be discussed in greater detail hereinbelow.

INDUSTRIAL APPLICABILITY

The novel, aqueous polymeric compositions-of-matter or formulations of the present invention can be utilized, in general, to produce such surface coatings as floor polishes, paints, adhesives and so forth, or more particularly, to produce durable, abrasion-resistant and solvent-resistant surface coatings or "finishes" on various substrates such as cardboard, concrete, counter tops, floors, marble and terrazzo, paper, stone, tile, wood and a variety of metal surfaces including polished metal surfaces and metal foils.

Still another application for the aqueous polymeric composition-of-matter or formulation of the present invention is in the production of water-based adhesives for various consumer and industrial uses.

Industrial end-use applications include surface-coatings and "finishes" for construction machinery and equipment, for bridges and road surfaces, for various parts or components of certain production-line machinery, and for a wide assortment of automotive components.

Consumer end-use applications include durable polymeric films and surface coatings for Various components of such a wide assortment of home-use appliances as clothes washers and dryers, dishwashers, radios, ranges and ovens, refrigerators, television sets, and video cassette recorders ("VCRs").

End-use applications for wood—industrial use, home use, and otherwise—include but are not limited to interior and exterior wood surface coatings such as stains and varnishes.

The novel aqueous polymeric compositions-of-matter or formulations of the present invention can also be used by industry or consumers as thickeners for paints and other surface coatings, as well as thickeners for printing inks and other formulations which need to "crosslink" upon drying. Further in that regard, various specific aqueous polymeric formulations produced in accordance with the principles of the present invention are able to provide certain "finishes" as well as other surface "treatments" for a number of relatively thin substrates such as paper, wherein such "finishes" and surface "treatments" are able to crosslink without liberating formaldehyde. Such an end-use is particularly desirable, for example, in the production of "release" coatings, overprint varnishes, and especially in relation to the production of rotogravure coatings.

Yet another specific end-use for the aqueous polymeric composition-of-matter or formulation of the present invention is in the production of a wide assortment of architectural surface coatings which need to form films of various thicknesses, at relatively low temperatures—that is, from about 25 degrees Celsius to about zero degrees Celsius—yet which provide desirable "surface hardness" and "durability" qualities, due to their crosslinked polymeric structure.

The novel aqueous polymeric composition-of-matter or formulation of the present invention can, moreover, be shipped in bulk-sized quantities or in various smaller-sized containers, as desired. For example, to satisfy certain industrial users, the aqueous polymeric composition-of-matter or formulation of the present invention can readily be shipped in 55-gallon drums, or in larger quantities such as in rail cars, if desired. Yet, if consumers desire smaller, more conveniently-sized volumetric quantities, the aqueous polymeric compositions can be sold in 1-gallon (or smaller) containers or even in conventional aerosol containers, as desired and as permitted by governmental authority.

BEST MODE FOR CARRYING OUT THE INVENTION

While the present invention is susceptible to embodiment in various forms, there is hereinbelow described in detail several presently preferred embodiments, with the understanding that the present disclosure is to be considered as merely an exemplification of the present invention, without limitation to the specific embodiments or examples discussed.

In the ensuing detailed description, certain terms as well as certain terminology (generally known by those skilled in the art) will be utilized for purposes of conciseness, and for otherwise elucidating the features and advantages of the present invention. Such terms are either defined as follows or are otherwise intended to mean the following.

The term "dispersion" is understood to connote a two-phase system of which one phase consists of finely-divided particles, often in the colloidal-size range, distributed throughout a "bulk" substance, wherein such finely-divided particles provide the "disperse" or internal phase and the bulk substance provides the "continuous" or external phase.

The term "elevated temperature" as used herein means any temperature greater than room temperature.

The term "emulsion" is understood by those skilled in the art as involving a stable mixture of two or more immiscible liquids held in suspension by small percentages of substances called "emulsifiers" (also called "surfactants" or "soaps"). All emulsions are known to include both a continuous phase as well as a discontinuous phase that is dispersed throughout the continuous phase.

The term "emulsion polymerization" is understood by those skilled in the art as involving the polymerization of monomers in aqueous media to form dispersed polymers having particle diameters in the range of approximately 20 to 1000 nm. ($10^9$ nanometers ("nm") are equivalent to one meter).

The term "glass-transition temperature" is understood by those skilled in the polymer chemistry art as representing the temperature at which the amorphous domains of a polymer take on the characteristic properties of the "glassy" state, wherein such polymeric glassy-state properties include brittleness, stiffness and rigidity.

The term "latex" is understood to refer to the product of a particular emulsion-polymerization reaction. In that regard, the term "latex" is typically understood to mean an "aqueous" or water-based polymer emulsion, without separation of the polymer product from the water and the other components that are contained within the emulsion.

The term "pendant moiety", in conjunction with chemical structure, is understood to mean a moiety which is attached to the backbone of a polymer molecule. Certain pendant moieties may be used for crosslinking purposes. Moreover, the term "pendant moiety" as used herein includes end groups.

The term "room temperature" shall be understood to mean a temperature of from about 20 degrees Celsius to about 25 degrees Celsius.

A number of additional terms are defined further below, throughout the body of this patent specification.

As was briefly mentioned above, one particularly noteworthy aspect or feature of the water-based polymeric composition-of-matter or formulation of the present invention, is the fact that it is a single-package composition which will remain stable for 12 months or more when stored at room temperature. Also, as was briefly mentioned above, the present invention is directed to a novel, low-VOC, water-based composition-of-matter or formulation that may contain only one polymeric ingredient or that may contain at least two polymeric ingredients. In the former case, the polymeric ingredient possesses both acid-functional as well as acetoacetoxy-type functional pendant moieties; and in the latter case, one polymeric ingredient has only acid-functional pendant moieties and the other polymeric ingredient has only acetoacetoxy-type functional pendant moieties. In the former case, the polymeric ingredient contains acid functionality sufficient to provide the polymeric ingredient with an acid number in the range of about 30 to about 300; and the weight-average molecular weight ("Mw") value of such a polymeric ingredient is typically between about 2,000 and 50,000. In this regard, the term "acid number" indicates the number of milligrams ("mg") of potassium hydroxide ("KOH") required to neutralize one gram of the polymeric ingredient.

Furthermore, the polymeric ingredient, in the former case, preferably has an acid number in the range of about 50 to about 150. Also, the polymeric ingredient, again in the former case, preferably has an Mw value of about 2,000 to about 40,000 and more preferably of about 2,000 to about 30,000.

However, in the latter case, there are at least two different polymeric ingredients and the polymeric ingredient having only acetoacetoxy-type functional pendant moieties typically has an Mw value of about 2,000 to about 1,000,000. Preferably, the Mw value is between about 5,000 and about 500,000; more preferably, the Mw value is between about 15,000 and about 300,000; and most preferably, the Mw value is between about 50,000 and about 200,000.

Also, with respect to the latter case, the polymeric ingredient possessing only acid functionality, which resembles the polymeric ingredient of the former case, particularly with respect to acid number ranges, may only be polymeric in structure. In particular, such a polymeric ingredient also preferably has an acid number in the range of about 50 to about 150 as well as an Mw value of preferably about 2,000 to about 40,000, more preferably about 2,000 to about 30,000.

The "non-polymeric" polyfunctional amine-containing compound (possessing at least two amine-functional moieties) typically has a chemical-formula weight of less than about 2,000 grams per mole, and preferably has a chemical-formula weight of less than about 1,000. grams per mole.

Another aspect or feature of the present invention is the method by which the aqueous polymeric composition-of-matter is produced. Still another aspect or feature of the present invention is the method whereby the aqueous polymeric composition-of-matter is applied to a suitable substrate to produce a crosslinked polymeric surface coating or film on the substrate.

One step of a particularly preferred method of producing the aqueous polymeric composition-of-matter is to combine preselected relative amounts of initiator, "surfactant" (also called "soap" or "emulsifier") and evaporable aqueous carrier in an agitated reactor of suitable size, and to heat the agitated reactor contents to a desired reaction temperature, typically 40 to 90 degrees Celsius, more preferably 75 to 85 degrees Celsius, over a predetermined period of time, which may typically be 1 hour. At least one chain-transfer agent, which is optional, may also be incorporated into the agitated reactor contents at this time, if desired. Nitrogen or another suitable "inert" gas may be introduced into the reactor headspace to eliminate oxygen from the reaction vessel, if desired.

The surfactant ingredient (or surfactant ingredients, if several are used) typically comprises at least one non-ionic emulsifier, at least one anionic emulsifier, or a mixture of non-ionic and anionic emulsifiers. Cationic emulsifiers as well as amphoteric emulsifier's may also be used in certain situations if desired.

Examples of useful anionic surfactants include but are not limited to organosulfates and sulfonates, for example, sodium and potassium alkyl, aryl and alkaryl sulfates and sulfonates, such as sodium 2-ethyl hexyl sulfate, potassium 2-ethyl hexyl sulfate, sodium nonyl sulfate, sodium lauryl sulfate ("NaLS"), potassium methylbenzene sulfonate, potassium toluene sulfonate, and sodium xylene sulfonate; so-called "higher" fatty alcohols, for example, stearyl alcohols, lauryl alcohols, and so forth, which have been ethoxylated and sulfonated; dialkyl esters of alkali metal sulfosuccinic acid salts, such as sodium or potassium diamyl sulfosuccinates, in particular sodium dioctyl sulfosuccinate; various formaldehyde-naphthalene sulfonic acid condensation products; alkali metal salts, as well as so-called "partial" alkali metal salts, and free acids of complex organic phosphate esters; and combinations thereof.

Examples of non-ionic surfactants which can be used in this invention include but are not limited to polyethers, for example, ethylene oxide and propylene oxide condensates which include straight and/or branched chain alkyl and alkaryl polyethylene glycol and polypropylene glycol ethers and thioethers; alkyl-phenoxy poly(ethyleneoxy) ethanols having alkyl groups containing from about 7 to about 18 carbon atoms and having from about 4 to about 240 ethyleneoxy units, such as heptyl-phenoxy poly(ethyleneoxy) ethanols, nonyl-phenoxy poly(ethyleneoxy) ethanols, and so forth; the polyoxyalkylene derivatives of hexitol, including sorbitans, sorbides, mannitans, and mannides; partial so-called "long" chain fatty-acid esters, such as the polyoxyalkylene derivatives of sorbitan monolaurate, sorbitan monopalmitate, sorbitan monostearate, sorbitan tristearate, sorbitan monooleate, and sorbitan trioleate; the condensates of ethylene oxide with a hydrophobic base, such as a base that is formed by condensing propylene oxide with propylene glycol; sulfur-containing condensates, for example, those prepared by condensing ethylene oxide with higher alkyl mercaptans, such as nonyl, dodecyl, or tetradecyl mercaptan, or with alkyl thiophenols wherein the alkyl group contains from about 6 to about 15 carbon atoms; ethylene oxide derivatives of long-chain carboxylic acids, such as lauric, myristic, palmitic, or oleic acids or mixtures of acids, such as so-called "tall" oil fatty acids; ethylene oxide derivatives of long chain-alcohols such as octyl, decyl, lauryl, or cetyl alcohols; and combinations thereof.

In the preparation of certain preferred embodiments of the aqueous polymeric compositions or formulations of the invention, the evaporable carrier will consist essentially of water ("$H_2O$") only. However, in the preparation of certain other embodiments of the aqueous polymeric compositions or formulations of the invention, it will be desirable that the evaporable carrier comprise water and at least one other water-miscible volatile organic liquid, wherein the amount of volatile organic compounds ("VOCs") does not exceed 200 grams per liter of the formulation.

Examples of water-miscible volatile organic liquids that are useful in this regard include but are not limited to alcohols; dialkyl ethers; ethylene and propylene glycols and their monoalkyl and dialkyl ethers; relatively low formula weight polyethylene oxides and their alkyl and dialkyl ethers (i.e., having a chemical-formula weight of less than about 200 grams per mole); dimethyl formamide; dimethyl acetamide; and combinations thereof.

After the desired reaction temperature is achieved, an emulsion-polymerizable mixture is incorporated into the agitated reactor contents over a predetermined period of time, such as 1 hour, while maintaining the desired reaction temperature.

One embodiment of such an emulsion-polymerizable mixture may include a monomeric ingredient having acid-functionality; and another embodiment of the emulsion-polymerizable mixture may include at least one acetoacetoxy-type functional moiety-containing monomeric ingredient as well as at least one acid moiety-containing monomeric ingredient. In either case, the acid moiety-containing ingredient is typically ethylenically-unsaturated.

The emulsion-polymerizable mixture may optionally further include at least one monomeric or polymeric acrylic or methacrylic acid ester as well as at least one polymeric or monomeric alkene (such as ethylene) or at least one vinylic monomer or polymer, provided that any such additional (optional) ingredient is addition-polymerizable with the acetoacetoxy-type functional moiety-containing and acid moiety-containing ingredients briefly mentioned above.

Examples of suitable acrylic and methacrylic acid esters include but are not limited to methyl acrylate ("MA"), methyl methacrylate ("MMA"), ethyl acrylate, ethyl methacrylate, propyl acrylate, propyl methacrylate, butyl acrylate ("BA"), butyl methacrylate, 2-ethyl hexyl acrylate ("2-EHA"), 2-ethyl hexyl methacrylate, decyl acrylate, decyl methacrylate, hydroxyethyl acrylate, hydroxyethyl methacrylate ("HEMA"), hydroxypropyl acrylate, hydroxypropyl methacrylate, and combinations thereof.

Suitable vinyl monomers include but are not limited to acrylamide; acrylonitrile; 1,2-butadiene; 1,3-butadiene; chloroprene; 1,3,5-hexatriene; styrene ("St"); alpha-methyl styrene; vinyl acetate; vinyl chloride; vinyl toluene; vinylidene chloride; and combinations thereof.

Acetoacetoxy-type functional moiety-containing ingredient, suitable for purposes of the present invention, are monomers having the ability to form stable enamine structures by reaction with amines, and having the following structure:

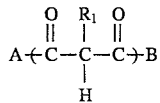

wherein $R_1$ is either H, alkyl (i.e., $C_1$ to $C_{10}$), or phenyl;

wherein A is either:

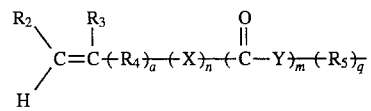

or

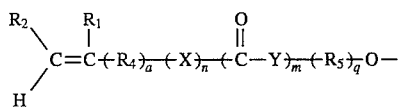

wherein $R_2$ is either H, alkyl (i.e., $C_1$ to $C_{10}$), phenyl, substituted phenyl, halo, $CO_2CH_3$, or CN;
wherein $R_3$ is either H, alkyl (i.e., $C_1$ to $C_{10}$), phenyl, substituted phenyl, or halo;
wherein $R_4$ is either alkylene (i.e., $C_1$ to $C_{10}$), phenylene, or substituted phenylene;
wherein $R_5$ is either alkylene or substituted alkylene;
wherein any of "a", "m", "n", and "q" is either 0 or 1;
wherein each of "X" and "Y" is either —NH— or —O—;
and wherein "B" is either "A", alkyl (i.e. $C_1$ to $C_{10}$), phenyl, substituted phenyl, or heterocyclic.

Preferred ethylenically-unsaturated acetoacetoxy-type functional moiety-containing ingredients include, among the following, various acetoacetamides, including but not limited to:

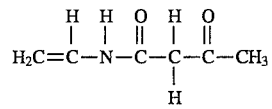

and

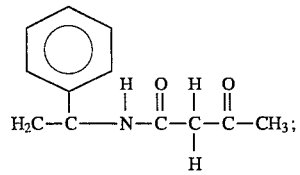

acetoacetoxyethyl methacrylate ("AAEM"); acetoacetoxyethyl acrylate ("AAEA"); allyl acetoacetate; vinyl acetoacetate; and combinations thereof.

AAEM is structurally represented as:

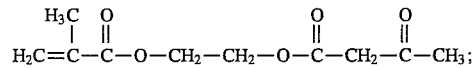

AAEA is structurally represented as:

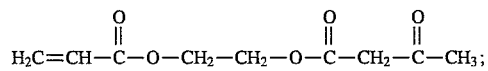

allyl acetoacetate is structurally represented as:

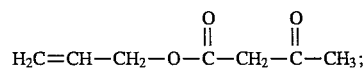

and vinyl acetoacetate is structurally represented as:

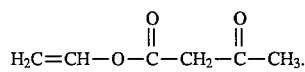

Particularly preferred ethylenically-unsaturated acetoacetoxy-type functional moiety-containing ingredients are acetoacetoxyethyl methacrylate ("AAEM"), acetoacetoxyethyl acrylate ("AAEA"), and combinations thereof.

Ethylenically-unsaturated carboxylic acid moiety-containing monomers suitable for purposes of the invention include but are not limited to acrylic acid, ethacrylic acid, fumaric acid-monoethyl ester, fumaric acid, itaconic acid, maleic acid, maleic anhydride, methacrylic acid ("MAA"), fumaric acid-monomethyl ester, methyl hydrogen maleate, and combinations thereof.

Ethacrylic acid is structurally represented as

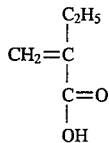

Fumaric acid-monoethyl ester is structurally represented as

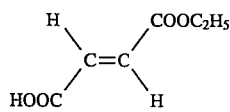

Fumaric acid-monomethyl ester is structurally represented as

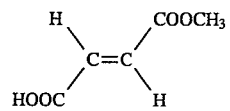

Methyl hydrogen maleate is structurally represented as

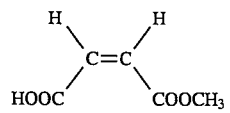

Preferred ethylenically-unsaturated carboxylic acid moiety-containing monomer is selected from the group consisting of acrylic acid, methacrylic acid, and combinations thereof.

Those above-discussed monomers and polymeric ingredients which are used to make the polymeric ingredient having either acid-functional pendant moieties, or acetoacetoxy-type functional pendant moieties, or both, are typically polymerized in the presence of a catalytic amount of a conventional free-radical initiator. Suitable initiators (also called "catalysts") include but are not limited to certain water-soluble initiators, various azo compounds, and select "redox combinations."

Suitable water-soluble initiators include but are not limited to peracetic acid; certain perborates; certain percarbonates; certain perphosphates; certain persulfates, such as sodium, potassium, ammonium, and barium persulfate; acetyl peroxide; hydrogen peroxide; hydroperoxides such as tertiary-butyl hydroperoxide; and combinations thereof. A presently preferred water-soluble free-radical initiator is ammonium persulfate ("APS").

Suitable azo-type initiators include but are not limited to azodiisobutyl nitrile; azobisdimethyl valeronitrile; azodiisobutyl amide; azobis(alpha-ethylbutyl nitrile); azobis(alpha, gamma-dimethyl-capronitrile); and combinations thereof.

One "redox combination," suitable for purposes of the present invention, may consist of a water-soluble persulfate as the "oxidizing" component of the redox combination, and a hydrosulfite, e.g. sodium hydrosulfite, as the "reducing" component of the redox combination. Further in accordance with principles of the present invention, water-soluble bisulfites, metabisulfites and/or thiosulfates, and formaldehyde sulfoxylates, may be used in lieu of the hydrosulfites.

As was briefly mentioned above, one step of a preferred method of producing the aqueous polymeric composition-of-matter or formulation of the present invention is to combine preselected relative amounts of initiator, surfactant, evaporable aqueous carrier and emulsion-polymerizable ingredients in an agitated reactor of suitable size, and to heat the agitated reactor contents to a desired reaction temperature over a predetermined period of time, thereby producing an aqueous polymeric emulsion. Optional, chain-transfer agent may also be used at this time, if desired.

During the reaction-hold period—that is, while the emulsion-polymerizable ingredients are addition-polymerizing—it may be desirable to incorporate certain additional amounts of initiator (or initiators, if several are used) into the agitated reactor contents, to achieve a desired degree (or percentage) of conversion or reaction of polymerizable ingredients. Such additional amounts of initiator ingredient (or initiator ingredients) may be the same as or may be different from the initiator ingredient (or ingredients) selected initially. Again, optional chain-transfer agent may be used, if desired.

For purposes of controlling the viscosity value of the polymeric formulation, it may be necessary to regulate the molecular weight of the polymer being formed. This can be accomplished by the incorporation into the reactor contents of a suitable chain-transfer agent. Suitable chain-transfer agents, to achieve this purpose, are well-known and include various halo-organic compounds such as carbon tetrabromide and dibromodichloromethane; sulfur-containing compounds such as the aklylthiols including ethanethiol, butanethiol, tert-butyl and ethyl mercaptoacetate, as well as the aromatic thiols; and various other organic compounds having hydrogen atoms which are readily "abstracted" by free radicals during polymerization.

The amount of chain-transfer agent needed to achieve a particular molecular weight, moreover, can be estimated by the use of the "Mayo" equation. (See, e.g., pages 226–233 of a text entitled Principles of Polymerization, second edition, by George Odian, published 1981 by John Wiley & Sons, Inc.)

Additional suitable chain-transfer agents or ingredients include but are not limited to butyl mercapto propionate; iso octyl mercapto propionic acid; iso octyl mercapto propionate ("IOMP"); bromoform; bromotrichloromethane ("BTCM"); carbon tetrachloride; alkyl mercaptans such as n-dodecyl mercaptan, tertiary-dodecyl mercaptan, octyl mercaptan, tetradecyl mercaptan, and hexadecyl mercaptan; alkyl thioglycolates such as butyl thioglycolate, iso octyl thioglycolate, and dodecyl thioglycolate; thioesters; and combinations thereof.

Upon achieving desired reaction conversion, the reactor contents may be maintained at the initial reaction temperature, or may be cooled to a temperature less than the reaction temperature, as desired.

Upon achieving desired reaction conversion, the pH of the reactor contents will be less than 7, and typically will be in the range of 2.5 to 6. At such pH conditions, the thus-produced addition-polymer particles, which are typically insoluble in the acidic aqueous phase, may give rise to a latex having a "milky white" appearance. Regardless of the latex appearance, an effective amount of "base" (as described below) is then added to the reactor contents for preventing gellation.

If the acid value of the thus-produced emulsion polymer is high (i.e., above about 80 milligrams ("mg") of KOH per gram ("g") of polymer solids), the thus-produced white-appearing latex of the reaction will dissolve and become a clear solution. (The thus-described emulsion-polymerization reaction typically results in the production of an alkali-soluble emulsion polymer having both acid-functional and acetoacetoxy-type functional pendant moieties.)

If the acid value of the emulsion polymer is low (below about 80 mg KOH/g of polymer), the polymer will typically not completely dissolve when the basic component is added; and the white, milky appearance may thus persist. The polymer particles may become swollen or may be relatively unaffected by the base, depending upon the specific monomers used and the acid value of the polymer.

In any event, the composition-of-matter or formulation thus also includes an amount of base which is effective for providing extended single-package storage stability.

Next incorporated into the aqueous polymeric emulsion presently being discussed is a suitable so-called "non-polymeric" polyfunctional amine-containing compound having at least two amine-functional moieties. Whereas one skilled in the art would expect the non-polymeric polyfunctional amine ingredient of the formulation to crosslink with the acetoacetoxy-type functional groups via enamine formation, and thereby cause gellation, surprisingly, such gellation does not occur. The mechanism for "stabilization" of the formulation is complex and probably results from (a) the base competing with the non-polymeric polyfunctional amine in reaction with the acetoacetoxy groups, thereby reducing the degree of crosslinking in the liquid state, and (b) the base neutralizing carboxylic acid groups on the polymer, thereby forming carboxylate ions, which would increase the solubility of the polymer and thereby lead to "swelling" rather than to agglomeration.

Laboratory results obtained, to date, however, suggest that at least some of the crosslinking—or a major portion of the crosslinking (in certain situations)—may be taking place in the liquid phase, possibly within several (i.e., 1 to 4) hours of adding the non-polymeric polyfunctional amine.

Accordingly, while not wanting to be tied to conjecture, yet desirous of providing a complete disclosure, it is presently postulated that addition of base to the reactor contents (1) competes with the amine-functional moieties vis-a-vis the acetoacetoxy-type functional moieties, thereby reducing the degree of crosslinking, and/or (2) enhances the colloidal stability of the polymer dispersion which forms when the crosslinking reaction takes place.

In order to obtain compositions or formulations having superior stability and which provide coatings possessing superior coating properties, it is suggested that the acid value of the polymer be between about 30 and 300, and it is preferred that the acid value of the polymer be between about 50 and 150, which will typically provide an alkali-soluble or alkali-swellable polymer. Since the viscosity of the aqueous composition-of-matter or formulation is very molecular-weight dependent, it is preferred that the molecular weight range of the emulsion polymer be relatively low, in order to maintain desired, low viscosity values at practical "solids" levels.

The weight-average molecular weight ("Mw") of the emulsion polymer should thus be in the range of between about 2,000 and 50,000, and preferably in the range of between about 2,000 to about 40,000, and more preferably in the range of between about 2,000 to about 30,000.

For purposes of dissolving such a polymeric ingredient in the aqueous carrier, it has been found that ammonia, an amine, an alkali metal hydroxide, or various combinations of these may be used, if desired. Suitable amines for such a purpose include but are not limited to methyl amine, dimethyl amine, trimethyl amine, ethyl amine, diethyl amine, triethyl amine, propyl amine, dipropyl amine, butyl amine, and combinations thereof. (It is understood that the term "propyl" may include n-propyl, isopropyl and combinations of these, and that the term "butyl" may include n-butyl, sec-butyl, tert-butyl and combinations of these, and so forth.)

In lieu of the above-discussed illustrative preferred emulsion-polymerization method, the emulsion polymerization reaction can also be conducted, for example, by performing the step of introducing a major portion of the total amount of initiator, surfactant, optional chain-transfer agent, and evaporable aqueous carrier into the reaction vessel, in the manner described above, and separately performing the step of pre-emulsifying the emulsion-polymerizable mixture (briefly described above) in a minor portion of the total amount of initiator, surfactant, optional chain-transfer agent, and evaporable aqueous carrier, for purposes of producing a so-called "pre-emulsion" mixture; and, thereafter, performing the step of introducing the pre-emulsion mixture into the reaction vessel (already containing the major portion amounts of initiator, surfactant, optional chain-transfer agent, and evaporable aqueous carrier).

In yet another preferred embodiment of the invention, as was briefly mentioned above, the composition-of-matter or formulation of the present invention is an aqueous polymeric coating composition which includes a mixture of at least two polymeric ingredients. One such polymeric ingredient includes only acetoacetoxy-type functional pendant moieties; and another polymeric ingredient includes only acid-functional pendant moieties. Indeed, it is not necessary to have both functionalities in a single polymeric ingredient, to achieve satisfactory storage stability of the formulation as well as satisfactory crosslinkability of the resultant polymeric surface coating. In particular, in the case where the formulation contains at least two polymeric ingredients of the above-described type, each such polymeric ingredient can be prepared according to well-known "staged" polymeric reactions. (See, e.g., U.S. Pat. No. 4,325,856 to Ishikawa et al. or U.S. Pat. No. 4,894,397 to Morgan et al.) In that regard, the acetoacetoxy-type functional moiety-containing polymeric ingredient may be water-insoluble and/or alkali-insoluble; or the acetoacetoxy-type functional moiety-containing polymeric ingredient may be rendered water-soluble and/or alkali-soluble by the incorporation of such monomers as acrylamide and/or acrylamide derivatives, hydroxy-functional monomers (such as hydroxyethyl acrylate), or other monomers known to impart water-solubility to polymers (such as monomers having ethylene oxide chains of predetermined length).

Further in that regard, while the above-described polymeric ingredients of the present invention are preferably made via conventional emulsion-polymerization methods, the above-described polymeric ingredients of the present invention may also be made via conventional solution-polymerization or conventional bulk-polymerization methods, if desired.

For example, suitable conventional methods for producing the alkali-soluble or alkali-swellable polymeric ingredients of the present invention via various well-known solution-polymerization mechanisms are disclosed e.g. in U.S. Pat. No. 3,673,168 to Burke, Jr., et al.; in U.S. Pat. Nos.

3,753,958 and 3,879,357, both to Wingler et al.; and in U.S. Pat. No. 3,968,059 to Shimada et al. Also, suitable conventional methods for producing the polymeric ingredients of the present invention via conventional bulk-polymerization mechanisms are disclosed in U.S. Pat. No. 4,414,370 to Hamielec et al.; in U.S. Pat. No. 4,529,787 to Schmidt et al.; and in U.S. Pat. No. 4,546,160 to Brand et al.

As was mentioned above, current laboratory observations suggest that the above-discussed polymeric ingredients containing the acetoacetoxy-type functional pendant moieties do crosslink, to some limited degree, with the amine-functional moieties of the non-polymeric polyfunctional amine, when the latter is added to the formulation; and the failure to observe gellation—which would be expected—is currently believed to be a result of the presence of the "base" ingredient in the reactor contents. In that regard, the fact that gellation does not take place is indeed surprising, particularly in view of the prior art. Nevertheless, regardless of what the prior art would-lead one to expect, the formulations of the present invention exhibit excellent shelf-storage stability, as is clearly evidenced by the absence of gel particles and minimal formulation viscosity change, during extended storage at both room temperature and elevated temperatures.

Moreover, as yet another aspect or feature of my present invention, in certain situations it may become desirable to utilize the thus-produced latex particles (discussed above) as a so-called "support" resin in a subsequent polymerization reaction, before any such non-polymeric polyfunctional amine is incorporated into the reactor contents. It must be borne in mind, however, that any such utilization thus reflects a preferred embodiment of my method of making the novel aqueous polymeric formulation of my present invention.

In such situations, it will accordingly be desirable to utilize the latex particles as a so-called "support" resin in a subsequent polymerization reaction. In that regard, the above-described polymerization methods, typically utilized to produce such a latex, are referred to as "stage one" or the "first stage" of a 2-stage polymerization procedure; and the thus-produced latex particles are referred to as the "stage one" polymer.

The subsequent polymerization reaction, thus referred to as "stage two" of the 2-stage procedure, is typically utilized for purposes of producing the ultimate film-forming polymeric ingredient or ingredients. Indeed, in the case where the formulation of the invention is an emulsion, and when it is desirable that the discontinuous phase of such an aqueous polymeric emulsion comprise discreet particles of the film-forming polymeric ingredient or ingredients, the latex particles produced via the first-stage polymerization reaction are used as a "support" resin in the second-stage polymerization procedure, as is illustrated by the following description.

Accordingly, into the agitated reactor containing the dissolved (or swollen) first-stage latex particles is next added a second monomeric mixture specifically so formulated as to produce an addition polymer that is insoluble in aqueous media having a pH of 2 to 10. Prior to incorporation of the second monomer mixture into the agitated reactor, however, additional water, additional surfactant, additional initiator, and/or additional optional chain-transfer agent, may be added, as desired. The second monomer mixture is fed into the reaction vessel over a predetermined period of time, typically one hour, while the desired second-stage polymerization reaction temperature is maintained, generally between 40 degrees and 90 degrees Celsius.

The second-stage monomer mixture generally includes at least one addition-polymerizable monomer, such as acrylic or methacrylic acid ester, a vinyl monomer, a nitrile, or an amide, as described hereinabove. Furthermore, the second-stage monomer mixture may optionally further include an acetoacetoxy-type functional moiety-containing monomer, or an acid moiety-containing monomer, or both, as described hereinabove, if desired.

Still further, to produce the second-stage polymer it may be desirable to incorporate an optional crosslinking ingredient or agent into the reactor contents.

In this regard, crosslinking agents that are suitable for purposes of the present invention include but are not limited to divinyl benzene ("DVB"), ethylene glycol diacrylate, ethylene glycol dimethacrylate, trimethylol propane triacrylate ("TMPTA"), trimethylol propane trimethacrylate, pentaerythritol triacrylate, pentaerythritol trimethacrylate, allyl acrylate, allyl maleate, allyl methacrylate, diallyl maleate, polyethylene glycol diacrylate, and polyethylene glycol dimethacrylate.

Additional crosslinkers, well known to those skilled in the art and suitable for purposes of my present invention, are disclosed in U.S. Pat. No. 3,915,921 to Schlatzer, Jr.; in U.S. Pat. No. 4,190,562 to Westerman; and in U.S. Pat. No. 4,554,018 to Allen.

During the second-stage reaction-hold period—that is, while the ingredients of the second-stage monomer mixture are addition-polymerizing in the presence of the dissolved or swollen latex particles of the first-stage polymerization—it may be desirable to incorporate further amounts of initiator into the agitated reactor contents, to achieve desired conversion of second-stage reaction. Upon achieving desired second-stage reaction conversion, the pH of the reactor contents is suitably adjusted, preferably using aqueous ammonia or other base, as previously described, to a pH above 7, typically in the range of 8 to 9.5. At such pH conditions, the aqueous polymeric emulsion typically consists of insoluble latex particles of second-stage polymer, dispersed throughout the continuous phase of the emulsion.

As was briefly noted above, desired crosslinking, in accordance with one of the several, above-noted features of my present invention, occurs when the acetoacetoxy-type functional moieties desirably react with the amine-functional moieties of the non-polymeric polyfunctional amine. As was "also briefly noted above, the novel water-based polymeric compositions-of-matter or formulations of my invention include an effective amount of base, for inhibiting undesirable reaction between the acetoacetoxy-type functional pendant moieties of the latex particles and the amine-functional moieties of the non-polymeric polyfunctional amine-containing compound, which would otherwise result in gellation. Indeed, desirable reaction, as between these mutually-reactive moieties, does not fully occur until after evaporation of the volatile components of the novel aqueous polymeric formulation.

Accordingly, a predetermined amount of the above-mentioned non-polymeric polyfunctional amine having at least two amine-functional moieties may, at this point in time, be introduced into the agitated reactor contents, typically over a time period of 5 to 15 minutes or longer. The non-polymeric polyfunctional amine, upon being thus added to the reactor contents, may dissolve in the continuous phase of the emulsion or may become distributed between the continuous and dispersed phases.

In that regard, sufficient non-polymeric polyfunctional amine is thus incorporated into the reactor contents, so as to cause the polymeric composition therein to typically contain about 0.5 to 1.5 acetoacetoxy-type functional pendant moieties per amine-functional moiety. Surprisingly, the polymeric composition thus produced is stable for at least 12 months when stored at room temperature.

The "non-polymeric" polyfunctional amine-containing compound (possessing at least two amine-functional moieties) typically has a chemical-formula weight of less than about 2,000 grams per mole, and preferably has a chemical-formula weight of less than about 1,000 grams per mole.

Referring, briefly, to European Pat. Application Nos. 0 341 886/A2 and 0 390 370/A1 (both mentioned above), please note that these European applications disclose use of polymeric polyfunctional amines of considerably greater chemical-formula weight (or molecular weight) than the non-polymeric polyfunctional amine-containing compounds, to which I make reference herein. It is also important to bear in mind that surface coatings of superior physical properties (in accordance with principles of my present invention), while not able to be made, via inclusion into my formulation, with polymeric polyfunctional amines, typical of what is disclosed in the '886 and '370 European applications, were able to be made when the non-polymeric polyfunctional amine-containing compounds discussed herein were selected. For example, formulations which included the non-polymeric polyfunctional amine-containing compounds disclosed herein were observed to be superior in "solvent resistance" to a formulation which included a polymeric polyfunctional amine, as disclosed in the '886 European patent application.

Accordingly, non-polymeric polyfunctional amines suitable for purposes of the present invention thus include aliphatic and cycloaliphatic amines having 2 to 10 primary and/or secondary amino groups and 2 to 100 carbon atoms.

Still further in this regard, suitable non-polymeric polyfunctional amines include but are not limited to hexamethylene diamine ("HMDA"); 2-methyl pentamethylene diamine; 1,3-diamino pentane; dodecane diamine; 1,2-diamino cyclohexane; 1,4-diamino cyclohexane; para-phenylene diamine; 3-methyl piperidine; isophorone diamine; bis-hexamethylene triamine; diethylene triamine ("DETA"); and combinations thereof.

Other non-polymeric polyfunctional amines, which are suitable, include those containing adducts of ethylene and propylene oxide, such as the "JEFFAMINE" series of "D", "ED" and "T" of Texaco Chemical Company of Houston, Tex., U.S.A. (See, e.g., the inside front covers of the 6 May and 24 Jun. 1991, issues of Chemical & Engineering News, published by the American Chemical Society.)

Preferred non-polymeric polyfunctional amines include 2 to 4 primary amino groups and 2 to 20 carbon atoms.

Particularly preferred non-polymeric polyfunctional amines include hexamethylene diamine ("HMDA"), diethylene triamine ("DETA"), and combinations thereof.

Until use is desired, the thus-produced crosslinkable, novel aqueous polymeric formulation can, for example, be stored at room temperature in a conventional container such as a metal can, a squeezable plastic tube, a glass bottle, an aerosol container, and so forth. When use is desired, the crosslinkable aqueous polymeric formulation is applied to a suitable substrate. Evaporation of the evaporable components of the aqueous emulsion then occurs over a predetermined period of time, which is typically governed by ambient conditions. Such evaporation enables desirable crosslinking to take place as between the above-discussed mutually-reactive moieties. A crosslinked polymeric surface coating is thus observed to form on the substrate in due course.

DETAILED DESCRIPTION OF EXAMPLES

The following examples are set forth to describe more particularly, to those skilled in the art, the various principles, features and advantages of my present invention. As such, they are not intended to limit my present invention but rather are merely illustrative of certain advantages of utilizing the novel crosslinkable aqueous compositions or formulations of my present invention, for purposes of producing desirable crosslinked polymeric surface coatings. Unless otherwise indicated, references to "percent" shall be understood to mean "weight percent" based upon total weight.

EXAMPLES 1–5

Coatings Via 1-Stage Polymerization Reactions

The below-listed examples illustrate the utility of the novel aqueous formulation of my present invention, when the formulation does not include the second-stage polymeric ingredient briefly mentioned above. (Incidentally, those examples reported herein which include the letter "C" are being reported as "comparative" examples, and thus are beyond the scope of my present invention.)

The water-based polymeric ingredient-containing formulations of Examples 1–5, listed below, were each prepared as follows.

Into a 2-liter, 4-necked flask (or reaction vessel) equipped with a thermometer, an agitator, a reflux condenser and a nitrogen ("$N_2$") inlet was charged a solution consisting of 537.4 grams ("g.") of de-ionized ("DI") water ("$H_2O$"), and 8.0 g. of 28 percent ("%") sodium lauryl sulfate ("NaLS") aqueous anionic surfactant. After heating to 80 degrees Celsius ("°C.") under a nitrogen ("$N_2$") atmosphere, 2 g. of ammonium persulfate ("APS") free-radical initiator was added, the temperature of the reactor contents was maintained at 80° C., and the agitator stirrer was set at 200 revolutions per minute ("RPM"). Next, a mixture of the below-listed amounts of monomer and chain-transfer agent (presented in Table I) were pumped into the reactor over a time period of 30 minutes while maintaining the desired emulsion-reaction temperature of 80° C.

TABLE I

| Gram Amounts Of Certain Ingredients In Ex. 1–5 | | | | | | |
|---|---|---|---|---|---|---|
| Ingredient | Function | Ex. 1 | Ex. 2 | Ex. 3C | Ex. 4C | Ex. 5 |
| MMA | Methacrylic Acid Ester Monomer | 28.4 | 52.7 | 51.3 | 75.6 | 52.6 |
| BA | Acrylic Acid Ester Monomer | 50.0 | 25.7 | 67.5 | 43.2 | 45.9 |
| MAA | Carboxylic Acid Monomer | 16.2 | 16.2 | 16.2 | 16.2 | 16.2 |
| AAEM | Acetoacetoxy Type Monomer | 40.5 | 40.5 | 0.0 | 0.0 | 20.3 |
| BTCM | Chain-Transfer Agent | 2.6 | 2.6 | 2.6 | 2.6 | 2.6 |

The mixture was then held at 80° C. for an additional 30 minutes and thereafter cooled to 25° C., which resulted in the production of a low-viscosity, translucent polymeric emulsion having a pH of 1.7 and a solids content, the latter also being expressed as percent non-volatiles ("NV"), of 20.6%. The glass-transition temperature ("Tg") of the thus-produced emulsion polymer is set forth in Table II, below.

TABLE II

| Glass-Transition Temperature Of Polymer | | | | | |
|---|---|---|---|---|---|
| Polymer | Ex. 1 | Ex. 2 | Ex. 3C | Ex. 4C | Ex. 5 |
| Tg, °C. | 10 | 40 | 10 | 40 | 25 |

To the polymeric emulsions of Examples 1–5 were added the gram-amounts of ingredients set forth in Table III below, thereby resulting in the production of five (5) aqueous polymeric solutions.

TABLE III

| Gram Amounts Of Base And Polyfunctional Amine | | | | | | |
| --- | --- | --- | --- | --- | --- | --- |
| Ingredient | Function | Ex. 1 | Ex. 2 | Ex. 3C | Ex. 4C | Ex. 5 |
| $NH_3^{a/}$ | Base | 12.8 | 12.8 | 12.8 | 12.8 | 12.8 |
| $HMDA^{b/}$ | $PFA^{c/}$ | 11.0 | 11.0 | 0.0 | 0.0 | 5.5 |

Footnotes:
a. The ammonia ("$NH_3$") utilized was 2.5% aqueous $NH_3$.
b. The hexamethylene diamine ("HMDA") utilized was 10% aqueous HMDA.
c. The function of the HMDA was as a "non-polymeric" polyfunctional amine ("PFA").

In each aqueous polymeric solution of Examples 1, 2 and 5 the thus-produced formulation contained an average ratio of one (1) acetoacetate-type functional moiety to one (1) amine-functional moiety.

Examples 3C and 4C, on the other hand, contained neither acetoacetoxy-type functional moiety nor amine-functional moiety. Indeed, examples 3C and 4C are presented for "comparison" purposes only, vis-a-vis Examples 1, 2 and 5 (which are illustrative of certain features and advantages of my present invention).

A portion of the thus-produced aqueous polymeric solutions of Examples 1–5 were set aside at room temperature for 12 hours, and were thereafter cast on "Leneta" charts, using a #4 wire-wound rod, for purposes of providing polymeric films of approximately 0.3 mils thickness.

Procedure

A "Leneta" test chart was attached to a commercially available "impression" bed, for each polymeric solution that was to be tested. Aqueous polymeric solution was then spread along the top and across the width of each bed-attached chart. Taking the wire-wound rod in both hands, the "drawdown" of each such polymeric solution was next determined, beginning at the top of each chart, above the location of the thus-applied liquid product. The rod was then drawn downwardly, without rolling, at a steady rate, thereby causing the liquid product to become spread across the chart.

The thus-produced polymeric films were all dried, both at room temperature ("R.T.") overnight (about 8 to 10 hours) and in an oven set at 60° C. for 5 minutes.

The physical properties of the thus-produced polymeric surface coatings were evaluated, with results appearing in Table IV, below.

TABLE IV

| | Film Properties Of Examples 1–5 | | | | | |
| --- | --- | --- | --- | --- | --- | --- |
| Film Drying Procedure | Film Test Procedures | Ex. 1 | Ex. 2 | Ex. 3C | Ex. 4C | Ex. 5 |
| Air Dried At R.T. Overnight | Acetone-Resistance | 5 | 5 | 1 | 1 | 3 |
| | Alcohol-Resistance | 5 | 5 | 1 | 1 | 3 |
| | 0.1% Aq. $NH_3$ Resistance | 5 | 5 | 1 | 1 | 3 |
| Oven Dried at 60° C. for 5 Min. | Acetone-Resistance | 5 | 5 | 1 | 1 | 5 |
| | Alcohol-Resistance | 5 | 5 | 1 | 1 | 5 |

TABLE IV-continued

| | Film Properties Of Examples 1–5 | | | | | |
| --- | --- | --- | --- | --- | --- | --- |
| Film Drying Procedure | Film Test Procedures | Ex. 1 | Ex. 2 | Ex. 3C | Ex. 4C | Ex. 5 |
| | Resistance 0.1% Aq. $NH_3$ Resistance | 5 | 5 | 1 | 1 | 5 |

The film "test procedures" listed in Table IV (above) are described below. In Table IV, the term "alcohol" means 60 weight percent aqueous ethyl alcohol.

The film "test procedures" listed in Table IV (above) are described below. In Table IV, the term "alcohol" means 60 weight percent aqueous ethyl alcohol.

Acetone Resistance

Directly onto each above-noted coating was applied a drop of acetone, from an eye dropper. After such contact for 10 seconds, the acetone was carefully removed from each coating with a cloth, and visually rated, as described below.

Alcohol Resistance

Directly onto each coating was applied a drop of 60% aqueous ethyl alcohol, from an eye dropper; and such was then covered with a commercially available eye glass. After such contact for 60 minutes, the alcohol was carefully removed from each coating with a paper towel and visually rated, after a subsequent "recovery" time period of 60 minutes.

Aqueous Ammonia Resistance

Directly onto each coating was applied a drop of 0.1 wt.-% aqueous ammonia, from a commercially available eye dropper. After such contact for 1 minute, the aqueous ammonia was carefully removed from each coating with a paper towel and visually rated, after a subsequent "recovery" time period of 60 minutes.

Visual Rating

Each thus-tested polymeric coating was visually rated, for "degree" of spot development and to observe whether any "degradation" or "solubilization" of the coating had resulted, after thus being contacted with acetone, alcohol and aqueous ammonia, in the manner described above.

The polymeric films were thus visually rated on a "spot"-test scale of "1" to "5", with "5" indicating no effect of the solvent on the coating. A "3" indicated that a "strong" spot was visible, but that the structural integrity of the film did not appear to have changed. A "1" indicated complete solubilization of the coating by the indicated solvent.

Storage Stability

Another portion of the above-described polymeric emulsions of Examples 1–5 were separately stored for six (6) weeks at 50° C.; and thereafter at room temperature ("R.T.") for about one (1) year. Films were subsequently cast onto so-called "Leneta" charts utilizing procedures described above, and solvent-resistance tests were performed (also utilizing procedures described above), with the results being summarized in Table V, below.

TABLE V

| | Film Properties After Storage Of Liquid Formulations For About 12 Months | | | | | |
|---|---|---|---|---|---|---|
| Film Drying Procedure | Film Physical Property | Ex. 1 | Ex. 2 | Ex. 3C | Ex. 4C | Ex. 5 |
| Air Dried At R.T. Overnight | Acetone-Resistance | 5 | 5 | 1 | 1 | 3 |
| | Alcohol-Resistance | 5 | 3 | 1 | 1 | 3 |
| | 0.1% Aq. NH$_3$ Resistance | 5 | 3 | 1 | 1 | 3 |
| Oven Dried At 60° C. For 5 Min. | Acetone-Resistance | 5 | 5 | 1 | 1 | 3 |
| | Alcohol-Resistance | 5 | 3 | 1 | 1 | 3 |
| | 0.1% Aq. NH$_3$ Resistance | 5 | 3 | 1 | 1 | 3 |

EXAMPLES 6–9

Coatings Via 2-Stage Polymerization

A presently preferred two-stage polymerization procedure is described as follows.

Into a 2-liter, 4-necked flask (or reaction vessel) equipped with a thermometer, an agitator, a reflux-condenser and a nitrogen inlet was charged 490.0 grams ("g.") of de-ionized ("DI") water ("H$_2$O") and 8.0 g. of 28% sodium lauryl sulfate ("NaLS") aqueous anionic surfactant solution. The flask headspace was blanketed with the inert gas, nitrogen ("N$_2$"), as the flask contents were heated to 80 degrees Celsius ("°C.").

A so-called "premix" was prepared separately, simply by combining the various (below-indicated) ingredients at room temperature. The premix included the monomer mixture and chain-transfer agent identified in Table VI, below.

TABLE VI

| | Premix Ingredients | |
|---|---|---|
| Ingredients | Function | Grams |
| MMA | Methacrylic Ester Monomer | 52.94 |
| AAEM | Acetoacetoxy Type Monomer | 33.09 |
| BA | Acrylic Ester Monomer | 30.44 |
| MAA | Acid-Functional Monomer | 15.88 |
| BTCM | Chain-Transfer Agent | 2.60 |

With the agitator stirrer set at 200 revolutions per minute ("RPM"), 15% (20 g.) of the premix of Table VI was added to the reactor contents, followed by 2.0 g. of ammonium persulfate ("APS") free-radical initiator dissolved in 10.0 g. of de-ionized water. After holding the reactor contents at the desired reaction temperature of 80° C. for 10 minutes, the remainder of the "premix" of Table VI was pumped into the reactor over a 30-minute time period. Thereafter, the resulting polymeric emulsion was held at 80° C. for an additional 10-minute time period before continuing with the second-stage portion of the 2-stage polymerization reaction. The pH of the polymeric emulsion in the reactor was determined to be 2.5. The first-stage polymeric emulsion had a solids content of 21.5% NV; and the first-stage emulsion polymer was found to have a Tg of 38° C.

Immediately following the 10-minute "hold" period and while the reactor contents were being maintained at 80° C., a portion of the polymeric emulsion from the above-discussed first-stage polymerization reaction was partially-neutralized, from 2.5 pH to 5.2 pH, by adding 2.5 g. of 25% aqueous ammonia ("aq. NH$_3$") dissolved in 10.0 g. of de-ionized water. Five minutes thereafter, a second-stage monomer mixture consisting of 226.8 g. styrene ("St") monomer, 44.1 g. 2-ethylhexyl acrylate ("2-EHA") monomer, and 44.1 g. butyl acrylate ("BA") monomer was incorporated into the reactor contents over a 60-minute time period while maintaining the reactor contents at the desired 80° C. reaction temperature. Immediately following the addition of the second-stage monomer mixture, the reactor contents were maintained at 80° C. for an additional 10-minute hold period. The pH of the reactor contents was 5.0. Thereafter, 10.1 g. of 25% aqueous ammonia ("aq. NH$_3$") dissolved in 10.3 g. of de-ionized water was incorporated into the reactor contents over a time period of 4 minutes, while maintaining the reactor contents at the desired reaction temperature of 80° C., thereby changing the pH of the reactor contents from 5.0 to 7.6. Immediately following the ammonia addition, the reactor contents were maintained at 80° C. for an additional 50-minute hold period. The reactor contents were next cooled to room temperature. The polymeric emulsion thus produced was a white, fluid latex having a pH of 7.6 and a minimum film-forming temperature ("MFT") of 45° C.

Then, four coating compositions (Examples 6–9) were prepared from the above-described latex as follows. In particular, the coating compositions were prepared by first adding a specified coalescing solvent, namely the monobutyl ether of ethylene glycol, to the above-described latex at room temperature at the rate of 8.0 g. of coalescing solvent over a 1-minute time period, and in the ratio amount of 8.0 g. of coalescing solvent per 100 g. of latex. Then, the various, below-indicated amounts of 10% aqueous hexamethylene diamine ("HMDA") non-polymeric polyfunctional amine and de-ionized ("DI") water were incorporated into 54.0 g. portions of the above-described latex, as presented in Table VII, below.

TABLE VII

| | Coating Formulation Ingredients | | |
|---|---|---|---|
| Example | 10% AQ. HMDA | DI Water | Ratio[d] |
| No. 6 | 0 | 0 | 0.0 |
| No. 7 | 0.224 g. | 5 g. | 0.5 |
| No. 8 | 0.448 g. | 5 g. | 1.0 |
| No. 9 | 0.672 g. | 5 g. | 1.5 |

[d] "Ratio" means the ratio of amine-functional moieties to acetoacetoxy-type functional moieties, present in the coating formulation of each of Examples 6–9.

A portion of the above-described coating formulations (Examples 6–9) were applied to 4-inch by 6-inch (about 10-centimeter by 15-centimeter) glass plates, using a #22 wire-wound rod, to produce several sets of surface coatings. One such set of surface coatings was allowed to air-dry at room temperature for 4 days prior to having its physical properties evaluated. Another such set of surface coatings was dried at 60° C. in an oven for 5 minutes and thereafter allowed to stand at room temperature for 4 days prior to having its physical properties evaluated. The polymeric films thus produced (which were clear, incidentally) were tested for solubility in acetone solvent and tetrahydrofuran ("THF") solvent by scraping portions of the polymeric film from the glass plates and immersing the thus-scraped film portions in each of the above-mentioned solvents for a time period of 24 hours. The glass plate-applied polymeric films were separately "spot"-tested with alcohol (in accordance with procedures set forth in Exs. 1–5 above). The glass plate-applied polymeric films were also tested for Konig hardness on a commercially-available "hardness" tester.

DIN 53157 was the procedure that was used to measure hardness. Konig hardness values are reported in "seconds".

TABLE VIII

Physical Properties Of Polymeric Films Produced From 2-Stage Polymerization Methods

| Film Drying Procedure | Film Physical Properties | Ex. 6 | Ex. 7 | Ex. 8 | Ex. 9 |
|---|---|---|---|---|---|
| No. 1[e] | Acetone Solubility | dissolved | swelled | swelled | swelled |
|  | THF Solubility | dissolved | swelled | swelled | swelled |
|  | Alcohol Resistance | 2 | 2 | 2 | 2 |
|  | Konig Hardness | 180 | 216 | 213 | 204 |
| No. 2[f] | Acetone Solubility | dissolved | swelled | swelled | swelled |
|  | THF Solubility | dissolved | swelled | swelled | swelled |
|  | Alcohol Resistance | 2 | 5 | 5 | 5 |
|  | Konig Hardness | 194 | 216 | 215 | 210 |

Footnotes:
[e] Procedure "No. 1" means the film was air-dried at room temperature over a 4-day time period.
[f] Procedure "No. 2" means the film was oven-dried at 60 degrees Celsius over a 5-minute time period, and thereafter at room temperature for a 4-day time period.

The alcohol-resistance test was conducted, as described above in connection with Examples 1 through 5, except that the contact time was 15 minutes.

The "hardness" value was determined via the above-mentioned "DIN 53157" test procedure, which is also referred to as the "Konig" pendulum test. (The "Konig" value, the amount of time that a particular pendulum is swinging, is typically reported in seconds.)

Another portion of the above-described polymeric coating formulations (Examples 6–9) was stored at room temperature for four (4) months. Thereafter, "new" polymeric films were applied to glass plates, dried and evaluated, as described above. The resulting polymeric film-property data of the coating formulations that had been stored at room temperature for four (4) months were virtually identical to the data set forth in Table VIII, above, and thus need not be re-tabulated.

EXAMPLE 10

2-Stage Polymerization With Crosslinker Agent

This particular example illustrates optional use of a conventional crosslinker agent, via incorporation into the novel aqueous composition-of-matter of my invention.

The first-stage polymerization described above in connection with Examples 6–9 was repeated, except that a monomer mixture consisting of 28.4 g. methyl methacrylate ("MMA") monomer, 44.5 g. butyl acrylate ("BA") monomer and 16.2 g. acetoacetoxyethyl methacrylate ("AAEM") monomer was utilized in the first-stage polymerization.

Thereafter, the second-stage polymerization procedure described above was substantially followed, except that the second-stage monomer mixture consisted of 189 g. styrene ("St") monomer, 59.9 g. 2-ethylhexyl acrylate ("2-EHA") monomer, 59.9 g. butyl acrylate ("BA") monomer, 31.5 g. acetoacetoxyethyl methacrylate ("AAEM") monomer, and 31.5 g. of trimethylolpropane triacrylate ("TMPTA") crosslinker agent.

The end-result of thus-employing a two-stage polymerization procedure was a white, fluid latex having a solids content of 44.4 % NV; a pH of 7.4; a Brookfield viscosity of 210 centipoises ("cPs."), utilizing a #2 spindle at 30 RPM, 20° C.; and a minimum film-forming temperature ("MFT") of 18° C. The procedure utilized to determine minimum film-forming temperature was ASTM D 2354-86.

To a 50-gram portion of the thus-produced latex were added 5.9 g. of 10% aqueous HMDA and 5 g. of de-ionized water, to produce sample "A"; and to another 50-gram portion of the latex was added 5 g. of de-ionized water only, to produce sample "B".

Samples "A" and "B" were then utilized as polymeric coating formulations. In particular, samples "A" and "B" were applied to glass plates and "Leneta" charts, in accordance with procedures set forth above, utilizing a #22 wire-wound rod, to produce polymeric films on the glass plates; and the glass plate-applied polymeric films were then oven-dried at 60° C. for 5 minutes. Thereafter, the Konig hardness value of each such (now-dry) polymeric film was determined immediately following removal from the oven and cool-down to room temperature, and four (4) days thereafter, with the observed results being reported as follows.

TABLE IX

Comparison Of Example 10 Samples

| Konig Hardness | Sample A | Sample B |
|---|---|---|
| Initial | 198 | 176 |
| 4 Days | 212 | 185 |

The "Leneta" chart coatings were tested for blocking resistance. The term "blocking resistance" means the ability to resist fusion together under specified temperature and pressure conditions.

The procedure to determine blocking resistance is described as follows. The "Leneta" chart-applied polymeric films were placed face-to-face and were thereafter subjected to a pressure of 100 g. per square centimeter for 3 days at 40° C., and thereafter visually inspected. (In this context, the term "face-to-face" means coated side on coated side.) The results are tabulated as follows.

TABLE X

Blocking Of Example 10 (Sample) Films

| Leneta Charts | Sample A | Sample B |
|---|---|---|
| Ex. 10 Films | No Blocking | Total Blocking |

In Table X (above) the term "no blocking" in the context of the "blocking-resistance" test, means that the coatings did not fuse together. In particular, the coatings could readily be removed from each other without damaging the surface of the coatings.

The term "total blocking", also in the context of the "blocking-resistance" test, means that the coatings fused together completely and could not be removed from each other without damaging the surface of the coatings.

EXAMPLE 11

Parquet Floor Lacquer Via 2-Stage Method

The first-stage polymerization procedure of Examples 6–9 was substantially repeated, except that the amounts of monomer and chain-transfer agent reported in Table XI (below) were utilized to produce the first-stage polymer of this particular example, which illustrates utility of the aqueous formulation of my invention as a lacquer for parquet floors. The optional chain-transfer agent used was iso octyl mercapto propionate ("IOMP").

TABLE XI

| First-Stage Polymerization Ingredients | | |
|---|---|---|
| Ingredient | Function | Amount, Grams |
| BA | Acrylic Acid Ester Monomer | 58.1 |
| AAEM | Acetoacetoxy-type Monomer | 40.5 |
| MMA | Methacrylic Acid Ester Monomer | 20.3 |
| MAA | Carboxylic Acid Monomer | 16.2 |
| IOMP | Chain-Transfer Agent | 4.1 |

The first-stage polymeric emulsion had a solids content of 21.0% NV and a pH of 2.5. The first-stage emulsion polymer had a Tg of 0° C.

Thereafter, the second-stage polymerization procedure of Examples 6–9 was substantially repeated, except that the monomer mixture of Table XII (below) was used as the second-stage monomer feed. In the second-stage polymerization, the optional crosslinking agent used was divinyl benzene ("DVB").

TABLE XII

| Second-Stage Polymerization Ingredients | | |
|---|---|---|
| Ingredient | Function | Amount, Grams |
| St | Vinylic Monomer | 189.0 |
| BA | Acrylic Acid Ester Monomer | 63.0 |
| 2-EHA | Acrylic Acid Ester Monomer | 63.0 |
| DVB | Crosslinking Agent | 1.6 |

The end-result of my thus-employing a two-stage polymerization procedure was a white, fluid latex having a solids content of about 45% NV, a pH of 7.6, a Brookfield viscosity (utilizing a #2 spindle at 30 RPM, 20° C.) of 110 mpas, and a minimum film-forming temperature ("MFT") of 21° C. (The term "mpas", which means milliPascal-seconds, is the so-called PSI System" terminology for viscosity. In this regard, 1 mpas is defined as 1 cP (centiPoise).) The thus-produced emulsion polymer was found to have a glass-transition temperature of 13° C.

To a 60-gram portion of the thus-produced latex was added and blended 12.5 g. of a 5% aqueous solution of hexamethylene diamine ("HMDA"), 8.5 g. of a commercially-available aqueous dispersion of polyethylene wax, 16 g. of water, and a 3.0-g. quantity of that coalescing solvent mentioned above in connection with Examples 6–9, namely the monobutyl ether of ethylene glycol.

A portion of the thus-resulting aqueous formulation was then applied to a parquet floor, and thereafter allowed to dry to a crosslinked polymeric film. The resulting crosslinked polymeric film was observed to provide the parquet floor with a relatively high-gloss finish which was further observed to maintain its high-gloss and otherwise desirable appearance during four (4) months of moderate-to-heavy pedestrian traffic.

Another portion of the above-described aqueous formulation (of Example 11) was stored for six (6) months at room temperature and, thereafter, the aqueous formulation was applied to glass slides and "Leneta" charts, utilizing procedures substantially set forth hereinabove, except that a #26 wire-wound rod was used. After allowing the thus-applied polymeric films to dry overnight (about 8 to 10 hours) at 20° C., the 60-degree specular gloss value of the "Leneta" chart coating was determined to be 89, and certain solvent-resistance tests were performed upon the polymeric films, with the results being reported in Table XIII, below. The test term "specular" relates, in general, to the mirror-like or reflective property of the substrate-applied polymeric film. The "specular gloss" of the thus-produced polymeric films was measured using a commercially-available so-called "BYK-Mallinkrodt" 60-Degree pocket glossmeter. Glossmeter readings were taken across the entire treated floor surface, and the readings were thereafter averaged.

TABLE XIII

| Evaluation Of Film Properties | |
|---|---|
| Film Property | Observation |
| Acetone Resistance | 5 |
| 10% Aq. NH$_3$ Resist. | 5 |
| H$_2$O Resist., 60 Min. | 5 |

The numerical value assigned to each above-listed "observation" as well as the procedures for determining acetone resistance, the resistance of 10% aqueous ammonia ("NH$_3$"), and water resistance, are all substantially as set forth above, except that the contact time for determining resistance of aqueous ammonia and water are 5 minutes and 60 minutes, respectively.

EXAMPLE 12C

Formulation Lacking Acid-Functional Monomer

Coating formulations made without an acid-functional monomer are outside the scope of this invention and have poor storage stability, as is shown by the following.

As an illustration, yet another coating formulation was prepared, substantially repeating the procedures set forth above for Example 1, except that the ingredients utilized were as set forth in Table XIV, below.

TABLE XIV

| Example 12C Formulation | | |
|---|---|---|
| Ingredient | Function | Amount, Grams |
| DI Water | Carrier | 712.3 |
| BA | Acrylic Acid Ester Monomer | 110.7 |
| AAEM | Acetoacetoxy-type Monomer | 90.2 |
| MMA | Methacrylic Acid Ester Monomer | 63.2 |
| 28% Aq. NaLS | Anionic Surfactant | 16.0 |
| BTCM | Chain-Transfer Agent | 5.7 |

The resulting polymeric emulsion was a white, fluid latex possessing a solids content of about 27% NV, a pH of 2.0, a Brookfield viscosity (utilizing a #2 spindle at 30 RPM, 20°

C.) of 5 mpas, and a minimum film-forming temperature ("MFT") of less than 0° C. The thus-produced emulsion polymer was found to have a glass-transition temperature of minus 8° C.

To a 100-g. sample of this Example 12C latex was added 2.49 g. of 25% aqueous ammonia ("NH$_3$"), 20.0 g. of de-ionized water, and 21.3 g. of a 10% aqueous solution of hexamethylene diamine ("HMDA"), which changed the pH to 11.6.

The thus-produced latex was observed to gel in about 12 hours, at room temperature; and the resulting gel was observed to be insoluble in acetone.

EXAMPLE 13

Separate Polymer Possessing COOH-Functionality

On the other hand, utilization of a polymeric emulsion possessing COOH-functionality in a separate polymer is within the scope of my present invention; and the following example is illustrative.

To a second 100-g. sample of the latex of Example 12C was added 3.64 g. of 25% aqueous ammonia ("NH$_3$"), 87.8 g. of a 30% aqueous solution of an alkali-soluble polymer having an acid value of 78, 64 grams of de-ionized water, and 21.3 g. of 10% aqueous hexamethylene diamine ("HMDA"). The above-mentioned polymer, made in accordance with U.S. Pat. No. 4,529,787, consisted of 25 mole % styrene monomer, 50 mole % methyl methacrylate monomer, 15 mole % butyl acrylate monomer, and 10 mole % acrylic acid monomer. The above-named ingredients were mixed into the second 100-g. sample of the Example 12C latex formulation, at room temperature, and in the order mentioned.

The resulting polymeric emulsion was found to have an initial viscosity of 5 cPs. and a pH of 9.8. After four (4) weeks storage at 50° C., the viscosity of the thus-produced polymeric emulsion was observed to remain substantially at 5 cPs. and the pH was observed to remain at 9.8.

The thus-described polymeric emulsion (of Example 13) was then utilized to produce polymeric films on Leneta charts, utilizing procedures described above; and such polymeric films, made from "fresh" polymeric emulsion as well as those made from the 4-weeks aged polymeric emulsion, were found to possess desirable acetone-resistance properties.

EXAMPLE 14

Pigmented Coatings Via 2-Stage Polymerization

This example illustrates the use of a known core-shell polymerization method (as is presently described in U.S. Pat. No. 4,894,397 to Morgan et al.) to prepare crosslinkable, pigmented coatings, in accordance with principles of the present invention. The procedure utilized is described as follows.

To a 1-liter, 4-necked flask fitted with a thermometer, an agitator, a reflux-condenser and a nitrogen inlet was added 480 g. of de-ionized ("DI") water ("H$_2$O") and 0.5 g. of the anionic surfactant sodium lauryl sulfate ("NaLS"), under an inert-gas atmosphere of nitrogen ("N$_2$"). After heating the reactor contents to 80° C., while setting the agitator stirrer at 200 revolutions per minute ("RPM"), 1.0 g. of the free-radical initiator ammonium persulfate ("APS") was incorporated into the reactor contents.

Thereafter, over a 30-minute period of time was added a first-stage monomer mixture consisting of 50 g. of ethyl acrylate ("EA") monomer, 30 g. of acetoacetoxyethyl methacrylate ("AAEM") monomer, 20 g. of methacrylic acid ("MAA") monomer, and 2 g. of the optional chain-transfer agent butyl mercapto propionate. A 15-minute "hold" period followed the monomer mixture addition.

The first-stage polymeric emulsion had a solids content of 16.8% NV and a pH of 2.4. The first-stage emulsion polymer had a Tg of 18° C. After the 15-minute "hold" period, 100 g. of methyl methacrylate ("MMA") monomer, the second-stage monomer, was added over an additional 30-minute period of time. The resultant latex was held at 80° C. for 60 additional minutes, before cooling to room temperature. The resultant latex was found to have a solids content of 27.7% NV and a pH of 2.7. Thereafter, two (2) separate 200-g. portions of the thus-produced latex were neutralized, each with 8.5 g. of 28% aqueous ammonia, to a pH of 8.7.

One of the thus-neutralized latexes was utilized as a first paint ("Paint A"). The second of the thus-neutralized latexes had 22.2 g. of 10% aqueous hexamethylene diamine ("HMDA") incorporated thereinto and thereafter was used to make a second paint ("Paint B").

Paints "A" and "B" were formulated, each with 33.0 g. of titanium dioxide ("TiO$_2$") and 40.1 grams of thus-produced emulsion solids, to produce 200 grams of conventional, white paints, each of about 37.4% NV. Such paints were applied to commercially-available, anodized aluminum panels, utilizing a #36 wire-wound rod.

Paints "A" and "B" each dried to a polymeric film having a film thickness of about 1.0 mil. (A "mil" is understood to mean one-thousandth, 0.001, of an inch. An inch is equivalent to 2.54 centimeters.) After the panel-applied films had been allowed to dry overnight (about 16 hours), the resulting, crosslinked polymeric films were subjected to a particular solvent-resistance test (MEK rubs). The thus-tested-panel-applied films were subsequently aged for seven (7) additional days at room temperature and were then again subjected to the above-noted solvent-resistance test.

"MEK Rubs" Procedure

A piece of cloth, wetted with MEK (methyl ethyl ketone), is rubbed back and forth, with the forefinger under moderate pressure, over the coated substrate, until a part of the coating comes loose from the substrate. The piece of cloth is re-wetted from time to time, to maintain a wet surface.

The results of the solvent-resistance test described above are set forth in Table XV, below.

TABLE XV

| | Solvent-Resistance Data | |
|---|---|---|
| MEK Rubs | Paint "A" | Paint "B" |
| 16 Hrs. | 3 | 23 |
| 7 Days | 23 | 211 |

The above data concerning Paint "B" illustrates the superior solvent-resistance effects of crosslinking.

EXAMPLE 15C

Latex Containing Acetoacetoxy Monomer

As the prior art suggests, there are many known latexes which might or which can contain an acetoacetoxy-type functional monomer. There is, however, no prior-art reference (to my knowledge) that discloses or even suggests my invention. In that regard, the following "comparative" example, Example 15C, describes the preparation of a certain latex which contains acetoacetoxy-type functional monomer, but not acid functional monomer. This comparative example is beyond the scope of my present invention.

Into a 1000-milliliter ("ml.") 4-necked flask fitted with a reflux-condenser, a thermometer and a variable-speed agitator was charged 487 g. of de-ionized water ("H₂O") which was heated to 80° C., while the flask was being sparged with the inert gas nitrogen ("N₂"). As soon as the reactor contents achieved a temperature of 80° C., 9.05 g. of "DOWFAX 2A1" (brand) surfactant and 0.87 g. of the free-radical initiator ammonium persulfate ("APS") were added. "DOWFAX 2A1" (brand) liquid surfactant, technically referred to as a sodium dodecyl diphenyloxide disulfonate, has a hydrophile-lipophile balance ("HLB") value of 16.7, and is commercially available from Dow Chemical Company of Midland, Mich., at a concentration of 45%.

Following addition of the above-identified free-radical initiator, and while maintaining the reactor contents at 80° C., a monomer mixture consisting of 109.14 g. of methyl methacrylate ("MMA") monomer, 94.59 g. of butyl acrylate ("BA") monomer, and 87.32 g. of acetoacetoxyethyl methacrylate was pumped into the reactor over a time period of 75 minutes. Immediately following addition of the monomer mixture, the agitated reactor contents were held at 80° C. for an additional 60 minutes and were thereafter cooled to room temperature. The thus-produced latex was found to be 35.78% NV, and was found to have a pH of 2.5, and a Brookfield viscosity (#2 spindle, at 25° C. and 60 RPM) of 19 cPs. The latex was neutralized to 8.5 pH with 30% ammonium hydroxide, and a stoichiometric amount of hexamethylene diamine ("HMDA") was added while stirring. In particular, 2.22 g. of 10% HMDA in water was mixed with 27.82 g. of latex. The resulting (mixed) formulation gelled in about one (1) hour.

A novel aqueous polymeric composition-of-matter has been described hereinabove. Also described hereinabove are methods of making the novel polymeric composition-of-matter, as well as methods of utilizing the novel polymeric composition-of-matter, for purposes of producing desired crosslinked surface coatings and films on various substrates. While these various aspects of my present invention have been described hereinabove with respect to certain preferred embodiments and illustrative examples, it is to be understood that the scope of my present invention is not to be limited to such embodiments and examples. On the contrary, a variety of alternatives will become apparent to those skilled in the art upon reading the foregoing description. For example and in connection with the two-stage polymerization procedures discussed above, either the first-stage polymerization or the second-stage polymerization, or both polymerization steps, may incorporate either the acid-functional monomer or the acetoacetoxy-type functional monomer (described above), in accordance with the principles of the present invention. Accordingly, such alternatives, changes and/or modifications are to be considered as forming a part of my present invention insofar as they fall within the spirit and scope of the appended claims.

I claim:

1. A method of producing a novel aqueous polymeric formulation, comprising the steps of:

admixing at least one polymeric ingredient, a non-polymeric polyfunctional amine, and base, in an evaporable aqueous carrier, wherein the polymeric ingredient has both acid-functional pendant moieties and pendant moieties having the ability to form stable enamine structures by reaction with amines and contain a divalent group of the structure

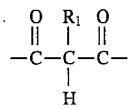

wherein $R_1$ is either H, a $C_1$ to $C_{10}$ alkyl group, or phenyl, wherein the non-polymeric polyfunctional amine has at least two amine-functional moieties, and wherein the amount of base in the aqueous carrier is effective for inhibiting gellation, which would otherwise occur as a result of crosslinking between the pendant moieties having the ability to form stable enamine structures and amine-functional moieties, thereby producing a reaction mixture;

holding the reaction mixture at a preselected reaction temperature for a predetermined period of time, thereby producing the aqueous evaporable polymeric formulation.

2. A method of producing a novel aqueous polymeric formulation, comprising the steps of:

admixing at least two polymeric ingredients, a non-polymeric polyfunctional amine, and base, in an evaporable aqueous carrier, wherein one of the two polymeric ingredients has acid-functional pendant moieties and the other of the two polymeric ingredients has pendant moieties having the ability to form stable enamine structures by reaction with amines and contain a divalent group of the structure

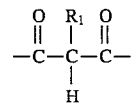

wherein $R_1$ is either H, a $C_1$ to $C_{10}$ alkyl group, or phenyl, wherein the non-polymeric polyfunctional amine has at least two amine-functional moieties, and wherein the amount of base in the formulation is effective for inhibiting gellation, which would otherwise occur as a result of crosslinking between the pendant moieties having the ability to form stable enamine structures and amine-functional moieties, thereby producing a reaction mixture;

holding the reaction mixture at a preselected reaction temperature for a predetermined period of time, thereby producing the aqueous evaporable polymeric formulation.

3. The method of either claim 1 or claim 2 wherein the pendant moieties having the ability to form stable enamine structures present in the polymeric ingredient are derived from a monomeric ingredient represented by the following structure:

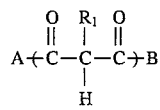

wherein $R_1$ is either H, a $C_1$ to $C_{10}$ alkyl group, or phenyl; wherein A is either:

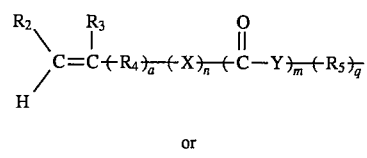

or

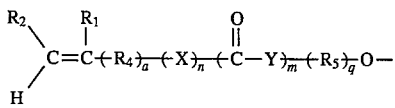

wherein $R_2$ is either H, a $C_1$ to $C_{10}$ alkyl group, phenyl, halo, $CO_2CH_3$, or CN;

wherein $R_3$ is either H, a $C_1$ to $C_{10}$ alkyl group, phenyl, or halo;

wherein $R_4$ is either a $C_1$ to $C_{10}$ alkylene group, or phenylene;

wherein $R_5$ is alkylene;

wherein any of "a", "m", "n", and "q" is either 0 to 1;

wherein each of "X" and "Y" is either —NH— or —O—; and wherein "B" is either "A", a $C_1$ to $C_{10}$ alkyl group, phenyl, or heterocyclic.

4. A method of producing a novel aqueous polymeric formulation, comprising the steps of:

producing a single package aqueous evaporable polymeric formulation that is stable for extended periods of time by admixing ingredients consisting essentially of at least one polymeric ingredient, a non-polymeric polyfunctional amine, and base, in an evaporable aqueous carrier, wherein the polymeric ingredient has both acid-functional pendant moieties and pendant moieties having the ability to form stable enamine structures by reaction with amines and contain a divalent group of the structure

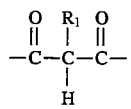

wherein $R_1$ is either H, a $C_1$ to $C_{10}$ alkyl group, or phenyl, wherein the non-polymeric polyfunctional amine has at least two amine-functional moieties and wherein the amount of base in the formulation is effective for inhibiting gellation, which would otherwise occur as a result of crosslinking to the point of gellation between the pendant moieties having the ability to form stable enamine structures and amine-functional moieties, thereby producing a reaction mixture;

holding the reaction mixture at a preselected reaction temperature for a predetermined period of time, thereby producing the aqueous evaporable polymeric formulation wherein the polymeric formulation is stable for at least 12 months at 20° C. and wherein the only mutually reactive pendant moieties present in the polymeric formulation which crosslink are the pendant moieties having the ability to form stable enamine structures and the amine-functional moieties.

5. The method of claim 4 wherein the polymeric ingredient having the pendant moieties having the ability to form stable enamine structures is formed by the reaction of acetoacetoxy ethylmethacrylate and at least one vinylic monomer which is copolymerizable with acetoacetoxy ethylmethacrylate.

6. The method of claim 4 wherein the pendant moieties having the ability to form stable enamine structures present in the polymeric ingredient are derived from a monomeric ingredient represented by the following structure:

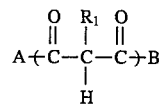

wherein $R_1$ is either H, a $C_1$ to $C_{10}$ alkyl group, or phenyl; wherein A is either:

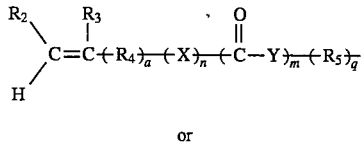

or

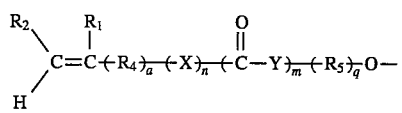

wherein $R_2$ is either H, a $C_1$ to $C_{10}$ alkyl group, phenyl, halo, $CO_2CH_3$, or CN;

wherein $R_3$ is either H, a $C_1$ to $C_{10}$ alkyl group, phenyl, or halo;

wherein $R_4$ is either a $C_1$ to $C_{10}$ alkylene group or phenylene;

wherein $R_5$ is alkylene;

wherein a, m, n, and q are either 0 to 1;

wherein X and Y are each either —NH— or —O—; and wherein B is A, a $C_1$ to $C_{10}$ alkyl group or phenyl.

7. The method of claim 4 wherein the base is ammonia or a volatile amine.

8. The method of claim 6 wherein the monomeric ingredient is selected from the group consisting of structures of the formula

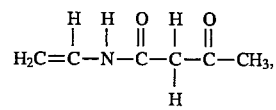

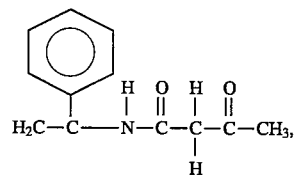

and combinations thereof.

9. The method of claim 6 wherein the monomeric ingredient is selected from the group consisting of acetoacetoxyethyl methacrylate, acetoacetoxyethyl acrylate, allyl acetoacetate, vinyl acetoacetate, and combinations thereof.

10. The method of claim 6 wherein the monomeric ingredient is selected from the group consisting of acetoacetoxyethyl methacrylate, acetoacetoxyethyl acrylate, and combinations thereof.

11. The method of claim 4 wherein the acid-functional moieties present in the polymeric ingredient containing them are derived from a monomeric ingredient which is an ethylenically-unsaturated carboxylic acid moiety-containing monomer.

12. The method of claim 11 wherein the monomeric ingredient is selected from the group consisting of acrylic acid, ethacrylic acid, fumaric acid-monoethyl ester, fumaric acid, itaconic acid, maleic acid, maleic anhydride, methacrylic acid, fumaric acid-monomethyl ester, methyl hydrogen maleate, and combinations thereof.

13. The method of claim 11 wherein the monomeric ingredient is selected from the group consisting of acrylic acid, methacrylic acid, and combinations thereof.

14. The method of claim 6 wherein the acid-functional moieties present in the polymeric ingredient containing them are derived from a monomeric ingredient which is an ethylenically-unsaturated carboxylic acid moiety-containing monomer.

15. The method of claim 14 wherein the monomeric ingredient is selected from the group consisting of acrylic acid, ethacrylic acid, fumaric acid-monoethyl ester, fumaric acid, itaconic acid, maleic acid, maleic anhydride, methacrylic acid, fumaric acid-monomethyl ester, methyl hydrogen maleate, and combinations thereof.

16. The method of claim 14 wherein the monomeric ingredient is selected from the group consisting of acrylic acid, methacrylic acid, and combinations thereof.

17. The method of claim 4 wherein the base is ammonia or a volatile amine selected from the group consisting of methyl amine, dimethyl amine, trimethyl amine, ethyl amine, diethyl amine, triethyl amine, isopropyl amine, dipropyl amine, n-propyl amine, n-butyl amine, sec-butyl amine, t-butyl amine, and mixtures thereof.

18. The method of claim 4 wherein the non-polymeric polyfunctional amine has a chemical-formula weight of less than about 2,000 grams per mole.

19. The method of claim 4 wherein the evaporable carrier comprises water and at least one volatile water-miscible liquid organic compound that is able to evaporate at room temperature, and wherein the total amount of volatile organic compound in the formulation does not exceed 200 grams per liter of the formulation.

20. The method of claim 4 wherein the nonpolymeric polyfunctional .amine is selected from the group consisting of hexamethylene diamine, 2-methyl pentamethylene diamine, 1,3-diamino pentane, dodecane diamine, 1,2-diamino cyclohexane, 1,4-diamino cyclohexane, para-phenylene diamine, 3-methyl piperidine, isophorone diamine, bis-hexamethylene triamine, diethylene triamine, and combinations thereof.

21. The method of claim 4 wherein the nonpolymeric polyfunctional amine is selected from the group consisting of hexamethylene diamine, diethylene triamine, and combinations thereof.

22. The method of claim 14 wherein the base is ammonia or a volatile amine, the non-polymeric polyfunctional amine is selected from the group consisting of hexamethylene diamine, 2-methyl pentamethylene diamine, 1,3-diamino pentane, dodecane diamine, 1,2-diamino cyclohexane, 1,4-diamino cyclohexane, para-phenylene diamine, 3-methyl piperidine, isophorone diamine, bis-hexamethylene triamine, diethylene triamine, and combinations thereof; the polymeric ingredient has a weight average molecular weight of from about 2,000 to about 40,000 and has an acid number in the range of about 30 to about 300.

23. The method of claim 16 wherein the base is ammonia or a volatile amine, the non-polymeric polyfunctional amine is selected from the group consisting of hexamethylene diamine, diethylene triamine, and combinations thereof; the polymeric ingredient has a weight average molecular weight of from about 2,000 to about 30,000 and has an acid number in the range of about 50 to about 150.

24. A method of producing a novel aqueous polymeric formulation, comprising the steps of:

producing a single package aqueous evaporable polymeric formulation that is stable for extended periods of time by admixing ingredients consisting essentially of at least two polymeric ingredients, a non-polymeric polyfunctional amine, and base, in an evaporable aqueous carrier, wherein one of the two polymeric ingredients has acid-functional pendant moieties and the other of the two polymeric ingredients has pendant moieties having the ability to form stable enamine structures by reaction with amines and contain a divalent group of the structure $$-\underset{\underset{H}{|}}{\overset{O}{\overset{\|}{C}}}-\underset{\underset{H}{|}}{\overset{R_1}{C}}-\overset{O}{\overset{\|}{C}}-$$

wherein $R_1$ is either H, a $C_1$ to $C_{10}$ alkyl group, or phenyl, wherein the non-polymeric polyfunctional amine has at least two amine-functional moieties and wherein the amount of base in the formulation is effective for inhibiting gellation, which would otherwise occur as a result of crosslinking to the point of gellation between the pendant moieties having the ability to form stable enamine structures and amine-functional moieties, thereby producing a reaction mixture;

holding the reaction mixture at a preselected reaction temperature for a predetermined period of time, thereby producing the aqueous evaporable polymeric formulation wherein the polymeric formulation is stable for at least 12 months at 20° C. and wherein the only mutually reactive pendant moieties present in the polymeric formulation which crosslink are the pendant moieties having the ability to form stable enamine structures and the amine-functional moieties.

25. The method of claim 24 wherein the polymeric ingredient having the pendant moieties having the ability to form stable enamine structures is formed by the reaction of acetoacetoxy ethylmethacrylate and at least one vinylic monomer which is copolymerizable with acetoacetoxy ethylmethacrylate.

26. The method of claim 24 wherein the pendant moieties having the ability to form stable enamine structures present in the polymeric ingredient are derived from a monomeric ingredient represented by the following structure:

$$A\!\!\left(\!\!\overset{O}{\overset{\|}{C}}-\underset{\underset{H}{|}}{\overset{R_1}{C}}-\overset{O}{\overset{\|}{C}}\!\right)\!\!B$$

wherein $R_1$ is either H, a $C_1$ to $C_{10}$ alkyl group, or phenyl; wherein A is either:

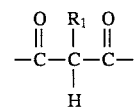

or

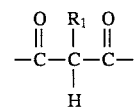

wherein $R_2$ is either H, a $C_1$ to $C_{10}$ alkyl group, phenyl, halo, $CO_2CH_3$, or CN;
wherein $R_3$ is either H, a $C_1$ to $C_{10}$ alkyl group, phenyl, or halo;
wherein $R_4$ is either a $C_1$ to $C_{10}$ alkylene group or phenylene;

wherein $R_5$ is alkylene;
wherein a, m, n, and q are either 0 to 1;
wherein X and Y are each either —NH— or —O—; and
wherein B is A, a $C_1$ to $C_{10}$ alkyl group or phenyl.

27. The method of claim 24 wherein the base is ammonia or a volatile amine.

28. The method of claim 26 wherein the monomeric ingredient is selected from the group consisting of structures of the formula

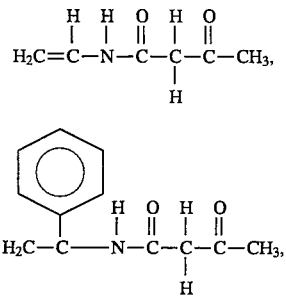

and combinations thereof.

29. The method of claim 26 wherein the monomeric ingredient is selected from the group consisting of acetoacetoxyethyl methacrylate, acetoacetoxyethyl acrylate, allyl acetoacetate, vinyl acetoacetate, and combinations thereof.

30. The method of claim 26 wherein the monomeric ingredient is selected from the group consisting of acetoacetoxyethyl methacrylate, acetoacetoxyethyl acrylate, and combinations thereof.

31. The method of claim 24 wherein the acid-functional moieties present in the polymeric ingredient containing them are derived from a monomeric ingredient which is an ethylenically-unsaturated carboxylic acid moiety-containing monomer.

32. The method of claim 31 wherein the monomeric ingredient is selected from the group consisting of acrylic acid, ethacrylic acid, fumaric acid-monoethyl ester, fumaric acid, itaconic acid, maleic acid, maleic anhydride, methacrylic acid, fumaric acid-monomethyl ester, methyl hydrogen maleate, and combinations thereof.

33. The method of claim 31 wherein the monomeric ingredient is selected from the group consisting of acrylic acid, methacrylic acid, and combinations thereof.

34. The method of claim 26 wherein the acid-functional moieties present in the polymeric ingredient containing them are derived from a monomeric ingredient which is an ethylenically-unsaturated carboxylic acid moiety-containing monomer.

35. The method of claim 34 wherein the monomeric ingredient is selected from the group consisting of acrylic acid, ethacrylic acid, fumaric acid-monoethyl ester, fumaric acid, itaconic acid, maleic acid, maleic anhydride, methacrylic acid, fumaric acid-monomethyl ester, methyl hydrogen maleate, and combinations thereof.

36. The method of claim 34 wherein the monomeric ingredient is selected from the group consisting of acrylic acid, methacrylic acid, and combinations thereof.

37. The method of claim 24 wherein the non-polymeric polyfunctional amine has a chemical-formula weight of less than about 2,000 grams per mole.

38. The method of claim 24 wherein the evaporable carrier comprises water and at least one volatile water-miscible liquid organic compound that is able to evaporate at room temperature, and wherein the total amount of volatile organic compound in the formulation does not exceed 200 grams per liter of the formulation.

39. The method of claim 37 wherein the nonpolymeric polyfunctional amine is selected from the group consisting of hexamethylene diamine, 2-methyl pentamethylene diamine, 1,3-diamino pentane, dodecane diamine, 1,2-diamino cyclohexane, 1,4-diamino cyclohexane, para-phenylene diamine, 3-methyl piperidine, isophorone diamine, bis-hexamethylene triamine, diethylene triamine, and combinations thereof.

40. The method of claim 37 wherein the non-polymeric polyfunctional amine is selected from the group consisting of hexamethylene diamine, diethylene triamine, and combinations thereof.

41. The method of claim 34 wherein the base is ammonia or a volatile amine, the non-polymeric polyfunctional amine is selected from the group consisting of hexamethylene diamine, 2-methyl pentamethylene diamine, 1,3-diamino pentane, dodecane diamine, 1,2-diamino cyclohexane, 1,4-diamino cyclohexane, para-phenylene diamine, 3-methyl piperidine, isophorone diamine, bis-hexamethylene triamine, diethylene triamine, and combinations thereof; the polymeric ingredient having acid-functional pendant moieties has a weight average molecular weight of from about 2,000 to about 40,000 and has an acid number in the range of about 50 to about 150; and the polymeric ingredient having the pendant moieties having the ability to form stable enamine structures has a weight average molecular weight of between about 5,000 and about 500,000.

42. The method of claim 36 wherein the base is ammonia or a volatile amine, the non-polymeric polyfunctional amine is selected from the group consisting of hexamethylene diamine, diethylene triamine, and combinations thereof; the polymeric ingredient having acid-functional pendant moieties has a weight average molecular weight of from about 2,000 to about 30,000 and has an acid number in the range of about 50 to about 150; and the polymeric ingredient having the pendant moieties having the ability to form stable enamine structures has a weight average molecular weight of between about 50,000 and about 20,000.

43. The method of claim 24 wherein the base is ammonia or a volatile amine selected from the group consisting of methyl amine, dimethyl amine, trimethyl amine, ethyl amine, diethyl amine, triethyl amine, isopropyl amine, dipropyl amine, n-propyl amine, n-butyl amine, sec-butyl amine, t-butyl amine, and mixtures thereof.

* * * * *

UNITED STATES PATENT AND TRADEMARK OFFICE
CERTIFICATE OF CORRECTION

PATENT NO. : 5,605,953  
DATED : February 25, 1997  
INVENTOR(S) : Richard J. Esser Page 1 of 1

It is certified that error appears in the above-identified patent and that said Letters Patent is hereby corrected as shown below:

Column 31,
Line 20, replace "0 to 1" with -- 0 or 1 --.

Column 35,
Line 2, replace "0 to 1" with -- 0 or 1 --.

Column 36,
Line 49, replace "about 20,000." with -- about 200,000 --.

Signed and Sealed this

Eleventh Day of December, 2001

Attest:

NICHOLAS P. GODICI
Attesting Officer   Acting Director of the United States Patent and Trademark Office